United States Patent [19]

Ogawa et al.

[11] Patent Number: 5,225,924
[45] Date of Patent: * Jul. 6, 1993

[54] OPTICAL BEAM SCANNING SYSTEM

[75] Inventors: Hideaki Ogawa; Eiichi Tamaki; Takumi Yoshida; Yasuyuki Wada; Akira Kuwabara, all of Kamikyo, Japan

[73] Assignee: Dainippon Screen Mfg. Co., Ltd., Kyoto, Japan

[ * ] Notice: The portion of the term of this patent subsequent to Aug. 11, 2009 has been disclaimed.

[21] Appl. No.: 500,971

[22] Filed: Mar. 29, 1990

[30] Foreign Application Priority Data

Apr. 7, 1989 [JP] Japan ................... 1-89460
May 31, 1989 [JP] Japan ................... 1-140097

[51] Int. Cl.$^5$ ................... G02B 26/08; G02B 1/33; G01D 9/42
[52] U.S. Cl. ................... 359/196; 359/211; 359/305; 250/235; 346/108
[58] Field of Search ................... 350/6.1-6.91, 350/358; 346/1.1, 108, 160, 103, 108, 110; 359/305-320, 196-226, 298-315, 634-640; 250/235, 236

[56] References Cited

U.S. PATENT DOCUMENTS

| 3,365,579 | 1/1968 | Giashwiller | 359/306 |
|---|---|---|---|
| 3,435,228 | 3/1969 | Gordon | 359/313 |
| 3,746,427 | 7/1973 | Foster | 359/305 |
| 3,835,249 | 9/1974 | Dattilo et al. | 359/217 |
| 4,000,493 | 12/1976 | Spaulding et al. | 346/1.1 |
| 4,107,701 | 8/1978 | Sprague et al. | 346/108 |
| 4,209,224 | 6/1980 | Stewart, Jr. | 359/201 |
| 4,257,016 | 3/1981 | Kramer, Jr. et al. | 359/305 |
| 4,426,134 | 1/1984 | Abramovitz et al. | 359/306 |
| 4,455,485 | 6/1984 | Hosaka et al. | 350/358 |
| 4,733,252 | 3/1988 | Daniele et al. | 346/103 |
| 4,773,754 | 9/1988 | Gisele | 359/201 |
| 4,810,068 | 3/1989 | Shimazu et al. | 359/305 |
| 4,841,135 | 6/1989 | Goto et al. | 350/6.8 |
| 4,855,761 | 8/1989 | Hiiro | 359/213 |
| 4,863,226 | 9/1989 | Houpt et al. | 359/212 |
| 4,896,169 | 1/1990 | Kuwabara et al. | 346/160 |
| 4,971,413 | 11/1990 | Znoue | 350/6.7 |
| 5,002,348 | 3/1991 | Wolf | 359/15 |

FOREIGN PATENT DOCUMENTS

| 157383 | 10/1985 | European Pat. Off. | 359/305 |
|---|---|---|---|
| 0240347 | 10/1987 | European Pat. Off. | |
| 0299455 | 1/1989 | European Pat. Off. | |
| 3806785 | 9/1988 | Fed. Rep. of Germany | |
| 60-107828 | 6/1985 | Japan | |
| 62-204141 | 9/1987 | Japan | |
| 62-226118 | 10/1987 | Japan | |
| 63-193124 | 8/1988 | Japan | |

Primary Examiner—Bruce Y. Arnold
Assistant Examiner—Thong Nguyen
Attorney, Agent, or Firm—Lowe, Price, LeBlanc & Becker

[57] ABSTRACT

An optical beam scanning system for scanning photosensitive material (1) comprises a laser (201), a beam splitter (204) for producing multibeams ($LB_a$, $LB_b$), AOM's (207a, 207b), a multibeam adjuster (300) for turning the multibeams to intersect each other at a prescribed point ($P_C$), a horizontal expander (211), an AOD (213), a vertical expander (214), a deflection direction adjuster (400) for rotating a deflection direction of the multibeams, and a variable focusing mechanism (500) comprising a plurality of object lenses (501-504). A pixel pitch and a spot diameter on the photosensitive material can be changed separately from each other by exchanging the object lenses and by adjusting an angle of intersection of multibeams ($B_a$, $B_b$) by means of the multibeam adjuster. Cylindrical lenses of the horizontal and vertical expanders are so positioned that they compensate a cylindrical lensing effect of the AOD.

19 Claims, 32 Drawing Sheets

DEFLECTION DIRECTION

FEED DIRECTION OF THE
PHOTOSENSITIVE MATERIAL 1
(−Y)

1

DEFLECTION DIRECTION

FEED DIRECTION OF THE
PHOTOSENSITIVE MATERIAL 1
(+Y)

$V_T$, $S_{DD}$

70 µs $S_M$, $S_{MD}$

50ns $S_{STA}$ $S_{CLK}$

TIME t

OPTICAL BEAM SCANNING SYSTEM

BACKGROUND OF THE INVENTION

1. Field of the Invention

The present invention relates to an optical beam scanning system for securing a photosensitive material with plural optical beams to form an image on the photosensitive material, and more particularly, the present invention relates to a technique for independently changing a diameter of beam spots and a pitch of pixels on the photosensitive material.

The present invention further relates to an optical beam deflector, which is often used in an optical beam scanning system, comprising an acoustooptic deflector (or AOD), and more particularly, the present invention relates to an optical beam deflector which can compensate a cylindrical lensing effect of the AOD.

2. Description of the Prior Art

An optical beam scanning system using plural laser beams (or a multibeam scanning system) is often included in a laser plotter for recording a black-and-white image on a photosensitive material or in a scanner for recording a halftone image with halftone dots on photosensitive material, in order to reduce scanning time.

FIG. 1 is a diagram showing scanning lines drawn with a multibeam scanning system. Plural sensing lines $L_1$-$L_{11}$ extending in a main scanning direction X are arrayed in a subscanning direction Y. For example, two beams simultaneously run along the scanning lines to form an image. The multibeam scanning system is adjusted so that two beam spots $SP_1$ and $SP_2$, which have a diameter d and which are separated from each other by a distance l, are formed on photosensitive material. The distance l satisfies the following equation:

$$l = (2n-1)P \tag{1}$$

where P is a pitch of pixels (or a pitch of scanning lines), and n is a natural number. The natural number n is two in FIG. 1.

As shown with a pair of arrows $AR_1$, the two beam spots $SP_1$, and $SP_2$ firstly run along the scanning lines $L_1$ and $L_4$. Secondly, the beam spots $SP_1$ and $SP_2$ are moved by a distance 2P relatively to the photosensitive material in a subscanning direction Y, thereby run along the scanning lines $L_3$ and $L_6$. The movement of the beam spots $SP_1$ and $SP_2$ in the subscanning direction Y and the scanning operation in the main scanning direction X are alternately repeated, whereby parallel scanning operation shown with pairs of arrows $AR_1$-$AR_4$ are achieved. Accordingly the scanning lines $L_1$, $L_3$, $L_5$, ..., $L_{11}$ specified with odd ordinal numbers are scanned with the first beam spot $SP_1$ and the scanning lines $L_2$, $L_4$, ..., $L_{10}$ specified with even ordinal numbers are scanned with the second beam spot $SP_2$.

The pitch of pixels is sometimes increased so that speed of forming an image is gained. On another occasion, the pitch of pixels is decreased so that an image is formed more minutely. When an optical beam scanning system using a single beam is used, the pitch of pixels can be adjusted through changing a clock pulse for controlling supply-timing of image data or through changing a scanning speed. When a multibeam scanning system is used, changing the pitch of pixels causes the following problem.

When a multibeam scanning system is used, the following equation holds:

$$(2n_1-1)P_1 = (2n_2-1)P_2 \tag{2}$$

where $P_1$ and $P_2$ are pitches of pixels and $n_1$ and $n_2$ are natural numbers. If the natural numbers $n_1$ and $n_2$ satisfying the equation (2) are found, either of the pitches $P_1$ and $P_2$ is attainable regardless of a distance between the beam spots $SP_1$ and $SP_2$. On the contrary, if a pair of the natural numbers $n_1$ and $n_2$ satisfying the equation (2) are not found, the pitches $P_1$ and $P_2$ are not interchangeable unless the distance between the beam spots $SP_1$ and $SP_2$ is changes. This can also be explained as follows: A distance $l_1$ between the beam spots $SP_1$ and $SP_2$ is given by the following equation when the pitch of pixels is $P_1$:

$$l_1 = (2n_1-1)P_1 \tag{3}$$

On the other hand, if the pitch of pixels is $P_2$, a distance $l_2$ between the beam spots $SP_1$ and $SP_2$ is given by the following equation:

$$l_2 = (2n_2-1)P_2 \tag{4}$$

Therefore, the distances $l_1$ and $l_2$ cannot be equal to each other unless the equation (2) is satisfied.

The distance l between the beam spots can be adjusted through changing a minification factor of a minifying optical system in the multibeam scanning system; this reduces the size of the beam spots formed on photosensitive material. However, the diameter d of the beam spots is also changed as well as the distance l by this method. The distance l, that is, the pitch of pixels cannot be independently changed by this method accordingly. Similarly, the diameter d cannot be changed separately from the pitch of pixels.

Meanwhile, the following problem is also known for a scanner which performs main scanning operation by deflecting at least one optical beam while performing subscanning operation by sequentially moving a beam scanning system relatively to the photosensitive material. The problem is that scanning lines are inclined due to the movement for the subscanning. FIGS. 2A through 2C illustrate inclined scanning lines formed on photosensitive material 1. An image-forming area 2 in the photosensitive material 1 is divided into a plurality of parallel strips $2a$, $2b$, ..., $2z$. The parallel strips $2a$-$2z$ are separately scanned in this order.

In FIG. 2A, an optical beam is cyclically deflected in a direction X while the photosensitive material 1 is moved in a direction ($-Y$), whereby the first strips $2a$ is scanned in a range between positions $Y_A$ and $Y_B$ in the direction Y. The other strips $2b$-$2z$ are scanned in the same manner. Since this divisional scanning method requires a smaller angle of deflection than a method in which a laser beam scans the full width of the image-forming area 2, the divisional scanning method causes less deflection errors. Further, if a width of scan is smaller, a focal length of a scanning lens can be reduced, and a diameter of a scanning beam is decreased, whereby an image can be more minutely formed. Moreover, the divisional scanning method can form an image faster than a method in which the main scanning and subscanning operations are performed by relatively moving a scanning optical system and the photosensitive material 1 mechanically because the divisional scanning method requires less movement of heavy members.

Even according to the divisional scanning method, scanning lines are inclined to the direction X in which a laser beam is deflected. The direction in which a beam spot runs on the photosensitive material 1 depends on a defection speed $V_X$ (not shown) and a subscanning speed (or a speed of moving the photosensitive material). The scanning line array 4 become to extend in a direction going up from left to right accordingly. As a result, an image formed on the photosensitive material 1 is also inclined to the direction X.

If all of the strips $2a$–$2z$ are scanned in a range between the positions $Y_A$ and $Y_B$ with a same deflection direction, the inclination can be compensated by several methods. According to one of the simplest methods, the inclination is compensated by setting an angle between the deflection direction and the direction in which the photosensitive material 1 is moved at a specific value deviated from 90 degrees. Japanese Patent Laying Open Gazette No.55-11917 also discloses a technique for compensating the inclination through deflecting a laser beam in the subscanning direction as well as the main scanning direction.

Incidentally, when the subscanning operation of all of the stripes are performed in a same direction, the photosensitive material 1 is fully returned in the direction Y after the scanning operation of each stripe is finished; this causes a time loss due to the returning movement. In order to eliminate the time loss, a reciprocating scanning apparatus is desired performing the subscanning operation from the position $Y_B$ to the position $Y_A$ in the stripes specified with even ordinal numbers.

When the reciprocating scanning operation is performed, the subscanning direction for the stripes specified with odd oridinal numbers (hereinafter referred to as odd-numbered stripes) is different from that for the stripes specified with even oridinal numbers (hereinafter referred to as even-numbered stripes). As shown in FIG. 2B, the inclination of the scanning line array 4 in the odd-numbered stripes is reversed from that in the even-numbered stripes. Consequently, if the above stated methods for compensating the inclination is applied, the inclination in the odd-numbered stripes might be compensated, but the inclination in the even-numbered stripes would increase as shown in FIG. 2C. Further, the degree of the inclination depends on the scanning speed $V_X$ and $V_Y$.

As described above, the inclination of scanning lines is caused by various reasons. When the pitch of pixels and the diameter of beam spots are separately adjusted, it is important to compensate the inclination of scanning lines, as described later. However, the above stated methods of compensating the inclination are not suitable in this case. A new method of compensating the inclination is desired accordingly, when the pitch of pixels and the diameter of beam spots are separately adjusted.

In order to cope with the above stated problems, a first aspect of the present invention relates to an optical beam scanning system of a multibeam type which can adjust a pitch of pixels separately from a diameter of beam spots.

Incidentally, an optical beam scanning system often includes an acoustooptic deflector (or AOD) for deflecting optical beams to thereby perform the main scanning operation. A second aspect of the present invention relates to a device for deflecting an optical beam comprising an AOD.

Since the AOD can rapidly change an angle of deflection, it is often used in a system for performing high speed scanning of an optical beam.

When the AOD rapidly changes an angle of deflection, a so-called cylindrical lensing effect appears, as well known in the art. The cylindrical lensing effect is described in L. D. Dickson, "Optical Considerations for an Acoustooptic Deflector," Applied Optical, Vol. 11, No. 10, October 1972, pp.2196–2202.

FIG. 3A schematically illustrates the cylindrical lensing effect on an AOD. An AOD 213 comprises an acoustic cell 213$a$ and a piezoelectric transducer 213$b$. An ultrasonic wave S generated by the transducer 213$b$ propagates in the acoustic cell 213$a$. The ultrasonic wave S is schematically drawn with parallel lines in FIG. 3A. A smaller interval of the parallel lines means a higher frequency of the ultrasonic wave. The frequency of the ultrasonic wave S is linearly swept from a maximum value $f_{max}$ to a minimum value $f_{min}$ repeatedly.

When optical beams $L_a$ and $L_b$ are introduced in the acoustical cell 213$a$, diffracted beam $L_{a1}$ and $L_{b1}$ of a first order are produced. A diffracted angle $\theta$ of the diffracted beams $L_{a1}$ and $L_{b1}$ is given by the following equation:

$$\theta = 0.5 f\lambda/v \tag{5}$$

where f is a frequency of the ultrasonic wave, $\lambda$ is a wavelength of light, and v is an acoustic velocity in the acoustic cell 213$a$.

When the frequency of the ultrasonic wave S changes at a high speed to vary the diffracted angle $\theta$ rapidly, the acoustic cell 213$a$ simultaneously includes acoustic waves of a certain band of frequency. Since the incident beam $L_b$ is farther from the transducer 213$b$ than the incident beam $L_a$, the incident beam $L_b$ is diffracted at an acoustic frequency $f_b$ higher than an acoustic frequency $f_a$ at which the incident beam $L_a$ is diffracted. A diffracted angle $\theta_b$ of the outgoing beam $L_{b1}$ is therefore larger than a diffracted angle $\theta_a$ of the outgoing beam $L_{a1}$. That is, when the ultrasonic wave is swept from a lower frequency to a higher frequency, the AOD 213 functions as a concave lens. On the other hand, when the ultrasonic wave is swept from a higher frequency to a lower frequency, the AOD 213 functions as a convex lens. These effects are called cylindrical lensing.

A method of compensating the cylindrical lensing effect is disclosed in Japanese Patent Laying Open Gazette No.60-107828, for example. According to the method, as shown in FIG. 3B, a compensating lens 213$c$ is placed at the image side of the AOD 213. The compensating lens 213$c$ makes the diffracted angles $\theta_c$ of the outgoing beams $L_{a1}$ and $L_{b1}$ equal to each other.

Since a difference between the diffracted angles $\theta_a$ and $\theta_b$ is small, a focal length of the compensating lens should be accurately set to make these angles equal to each other. Since a fabrication tolerance of a focal length is usually about plus or minus 5%, the compensating lens of higher accuracy is expensive.

Incidentally, the number of resolvable spots scanned by an AOD depends on a diameter of a light beam in an optical system. It is therefore desired to increase a diameter of a light beam to increase the number of resolvable spots. In order to meet this requirement, a lens system for expanding a light beam is placed near an AOD. If the compensating lens for compensating the cylindrical lensing effect is further added, the number of lenses used in the optical system becomes fairly large; this makes alignment of the lenses difficult.

SUMMARY OF THE INVENTION

The present invention is directed to an optical beam scanning system for scanning a photosensitive material with optical beams while moving the optical beams relatively to the photosensitive material, comprising: means for generating a plurality of optical beams, means for modulating the plurality of optical beams, beam turning means for turning modulated optical beams to thereby produce a first beam group consisting of optical beams which intersect each other at a prescribed point, angle changing means connected to the beam turning beams for rotationally displacing the beam turning means to thereby change an angle of intersection of the first beam group, deflecting means placed at the prescribed point for periodically deflecting the first beam group to thereby produce a second beam group, and focusing means for focusing each optical beam of the second beam group on the photosensitive material.

Preferably, the focusing means comprises a focusing optical system whose focal length is changeable. The focusing optical system may comprise a plurality of object lenses whose focal lengths are different from each other, and a mechanism for selecting one of the plurality of object lenses to focus the second beam group on the photosensitive material. Instead, the focusing optical system may comprise a zoom lens.

The optical beam scanning system may further comprises: direction rotating means placed between the deflecting means and the focusing means for rotating a deflection direction of the second beam group, and means connected to the direction rotation means for rotating the direction rotating means to thereby change an angle of rotation of the deflection direction of the second beam group. The direction rotating means may have a pechan prism or a dove prism.

The present invention is further directed to an optical beam scanning system comprising: means for generating an optical beam of a parallel bundle of rays, a one-directional beam expander consisting of a plurality of cylindrical lenses to expand a width of the optical beam in a prescribed direction, and an acoustooptic deflector receiving an expanded optical beam from the one-directional expander for deflecting the expanded optical beam, where a deflected beam is made a parallel bundle of rays by adjusting respective positions of the plurality of cylindrical lenses.

Preferably, the one-directional expander has first and second cylindrical lenses, the first cylindrical lens makes the optical beam a divergent ray, the second cylindrical lens makes the divergent ray a convergent ray converging at a prescribed point, and the acoustooptic deflector has a cylindrical lensing effect by which the acoustooptic defector is equivalent to a concave lens whose image-side focal point is located at the prescribed point. Instead, the one-directional expander may consist of first and second cylindrical lenses, where the first cylindrical lens makes the optical beam a first divergent ray, the second cylindrical lens makes the first divergent ray a second divergent ray diverging from a prescribed point, and the acoustooptic deflector has a cylindrical lensing effect by which the acoustooptic deflector is equivalent to a convex lens whose object-side focal point is located at the prescribed point.

The optical beam scanning system may further comprises: a second one-directional expander placed at the image side of the acoustooptic deflector consisting of a plurality of cylindrical lenses which are the same as the plurality of cylindrical lenses of the one-directional expander, the second one-directional expander expanding a width of the deflected beam in a second direction perpendicular to the prescribed direction to thereby make an optical beam leaving the second one-directional expander a parallel bundle of rays.

According to an aspect of the invention, the deflecting means is an acoustooptic deflector having a cylindrical lensing effect by which the acoustooptic deflector is equivalent to a concave lens, and the optical beam scanning system further comprises: a first one-directional expander to expand each beam of the first beam group in a first direction, the first one-directional expander consisting of first and second cylindrical lenses placed between the angle changing means and the acoustooptic deflector, the first cylindrical lens making each beam of the first beam group a divergent ray, the second cylindrical lens making the divergent ray a convergent ray converging at a image-side focal point of the concave lens, and a second one-directional expander to expand each beam of the second beam group in a second direction perpendicular to the first direction while maintaining each beam leaving the second one-directional expander a parallel bundle of rays, the second one-directional expander consisting of first and second cylindrical lenses placed between the acoustooptic deflector and the focusing means, the first and second cylindrical lenses of the second one-directional expander being the same as the first and second cylindrical lenses of the first one-directional expander, respectively. On the other hand, when the acoustooptic deflector has a cylindrical lensing effect by which the acoustooptic deflector is equivalent to a convex lens, the optical beam scanning system further comprises: a first one-directional expander to expand each beam of the first beam group in a first direction, the first one-directional expander consisting of first and second cylindrical lenses placed between the angle changing means and the acoustooptic deflector, the first cylindrical lens making each beam of the first beam group a divergent ray, the second cylindrical lens making the divergent ray a convergent ray converging at a object-side focal point of the convex lens, and a second one-directional expander to expand each beam of the second beam group in a second direction perpendicular to the first direction while maintaining each beam leaving the second one-directional expander a parallel bundle of rays, the second one-directional expander consisting of first and second cylindrical lenses placed between the acoustooptic deflector and the focusing means, the first and second cylindrical lenses of the second one-directional expander being the same as the first and second cylindrical lenses of the first one-directional expander, respectively.

Accordingly, an object of the present invention is to provide an optical beam scanning system of a multibeam type which can independent change a pitch of pixels.

Another object of the present invention is to provide an optical beam scanning system of a multibeam type which can further change a diameter of beam spots independently as well as a pitch of pixels.

Still another object of the present invention is to compensate inclination of scanning lines.

Another object of the present invention is to provide an optical beam scanning system which can compensate a cylindrical lensing effect of an AOD without a compensating lens of high accuracy.

Still another object of the present invention is to provide an optical beam scanning system which comprises only a small number of simple lenses and which can expand a diameter of an optical beam while compensating the cylindrical lensing effect.

These and other objects, features, aspects and advantages of the present invention will become more apparent from the following detailed description of the present invention when taken in conjunction with the accompanying drawings.

DESCRIPTION OF THE PREFERRED EMBODIMENTS

Firstly the structure of an image drawing system including an optical beam supporting system according to the present invention and its operation will be explained, and secondly the detail of the optical beam scanning system will be explained.

Figure 4:
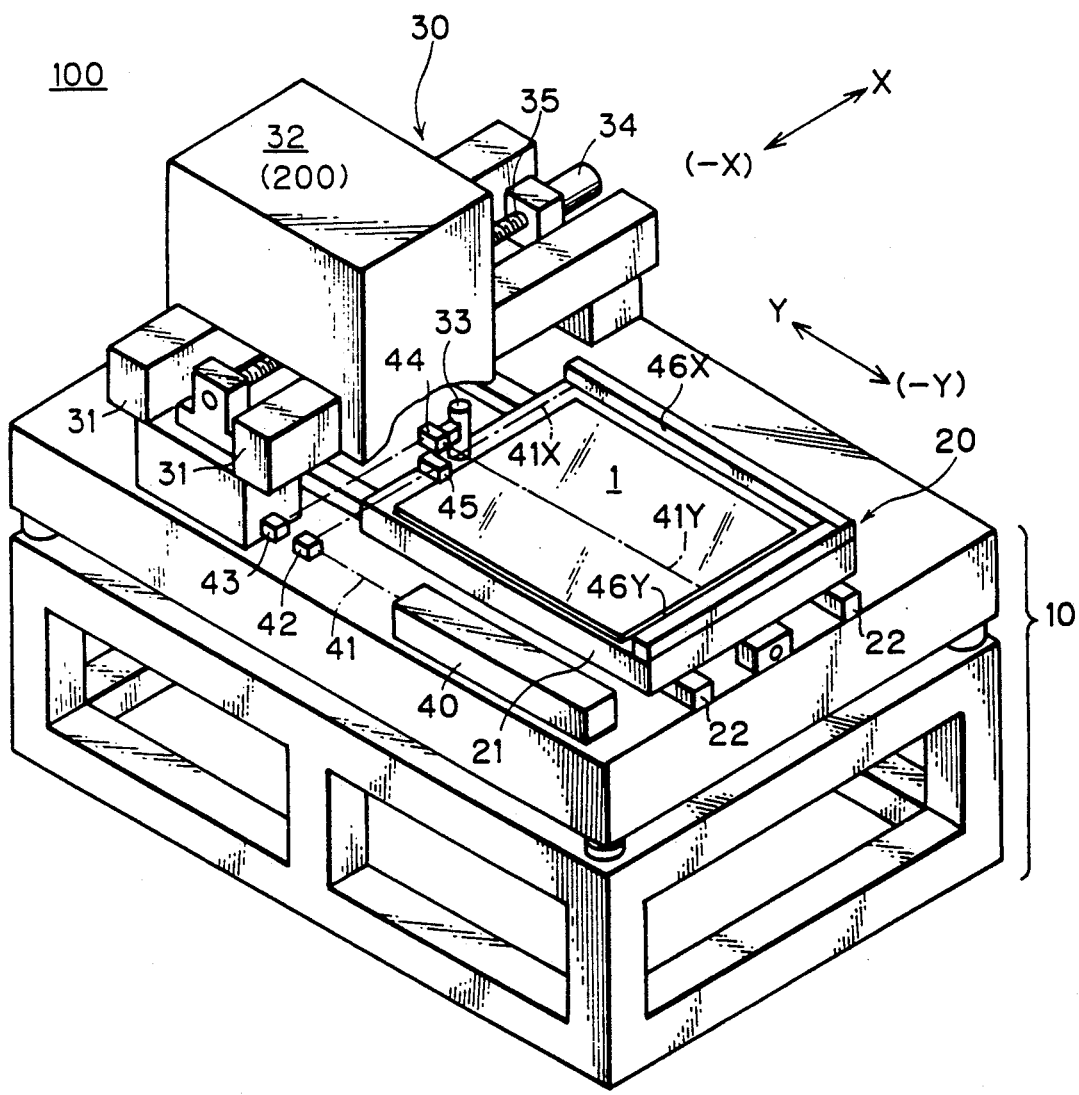
FIG. 4 is a perspective view of an image forming system including an optical beam scanning system according to the present invention.

FIG. 4 is a perspective view of an image drawing system 100 including an optical beam scanning system according to the present invention. The image drawing system 100 comprises a feed mechanism 20 for feeding photosensitive material 1 and a drawing mechanism 30 settled on a base 10. The feed mechanism 20 has a suction table 21, on which the photosensitive material 1, such as a glass dry plate, is sucked to be fixed.

The suction table 21 is installed on a pair of guides 22 extending in a horizontal direction Y. The suction table 21 can be reciprocally moved in the directions (Y and −Y) by means of a ball screw drived by a motor. The photosensitive material 1 can be reciprocally moved in the directions (Y and −Y) accordingly.

The drawing mechanism 30 has a pair of guides 31 extending in a horizontal direction X. The direction X is perpendicular to the direction Y. A housing 32 is settled on the guides 31 to slide thereon. An optical beam scanning system 200 embodying the present invention is included in the housing 32. A drawing head 33, which is shown at a notched portion in FIG. 4, is a component of the optical beam scanning system 200. The housing 32 including the optical beam scanning system 200 is drived by a ball screw 35 which is rotated by a motor 34, to be thereby moved in the direction X or (−X), and the drawing head 33 is moved in the direction X or (−X) accordingly.

A He-Ne laser 40 is installed on an upper surface of the base 10. A laser beam 41 generated by the laser 40 is splitted into two laser beams 41X and 41Y by beam splitters 42-45. The beam splitters 44 and 45 are fixed on the drawing head 33. The suction table 21 is provided with plane mirrors 46X and 46Y settled at its end portions in the directions X and (−Y), respectively. The laser beams 41X and 41Y are reflected by the mirrors 46X and 46Y, respectively, thereby returned to the beam splitters 44 and 45. An interferometer (not shown) measures an optical path length between the beam splitter 45 and the mirror 46X and one between the beam splitter 33 and the mirror 46Y. The relative position of the photosensitive material 1 to the drawing head 33 is found on the basis of the optical path lengths.

Incidentally, the feed mechanism 20 is wholly covered with a shielding hood (not shown), which can be opened.

Figure 1:
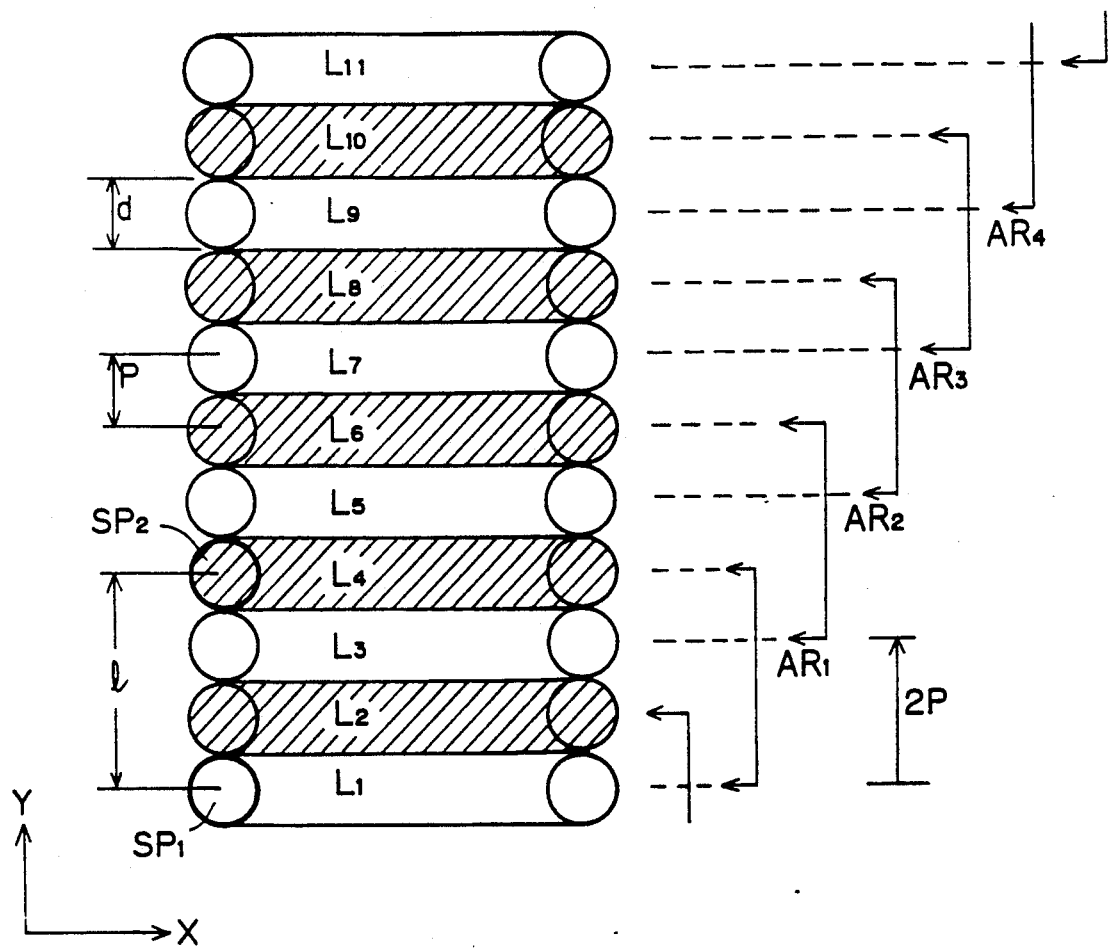
FIG. 1 is a diagram schematically showing a scanning method with multibeams.
Figure 2A:
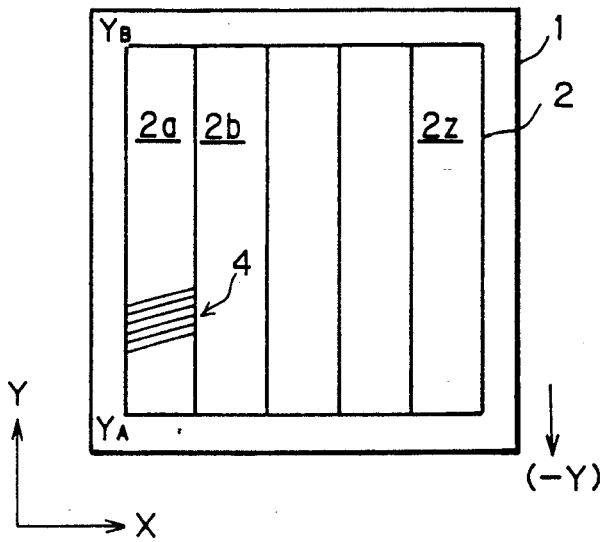
FIGS. 2A through 2C are diagrams schematically showing inclined scanning lines.
Figure 2B:
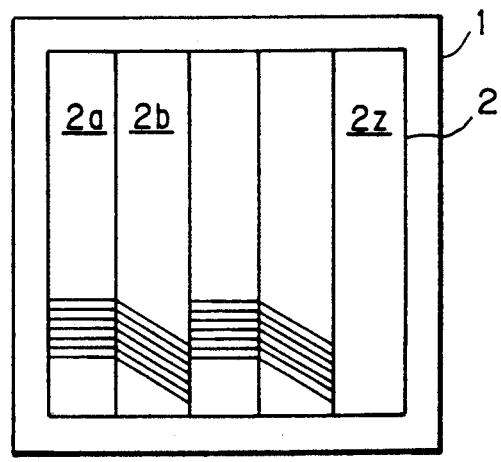
Figure 2C:
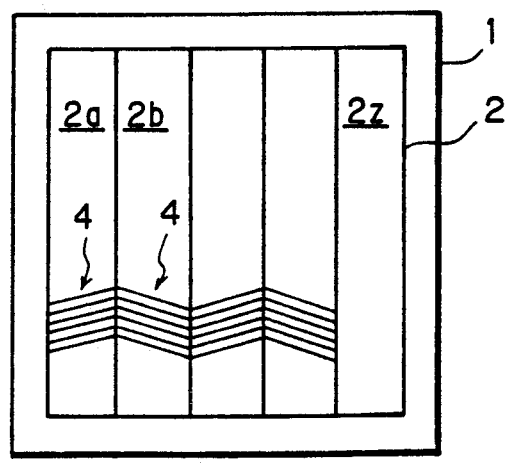
Figure 3A:
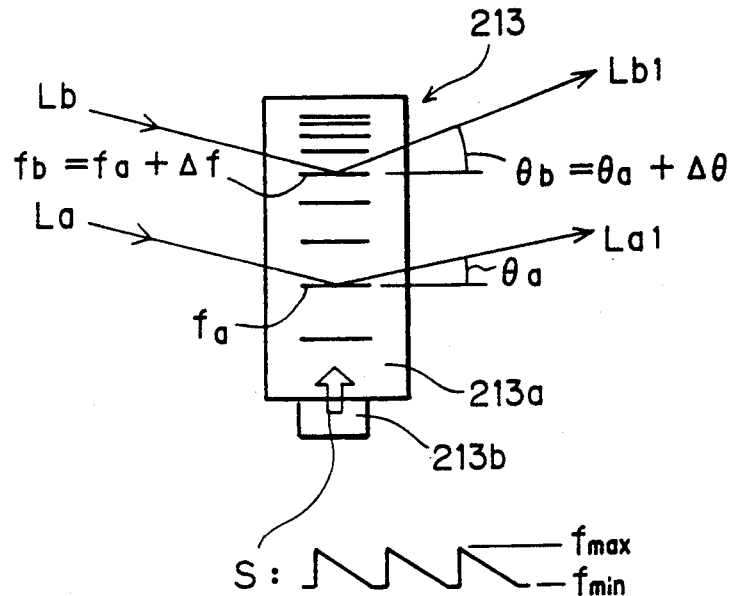
FIGS. 3A and 3B are diagrams schematically showing a cylindrical lensing effect of an AOD.
Figure 3B:
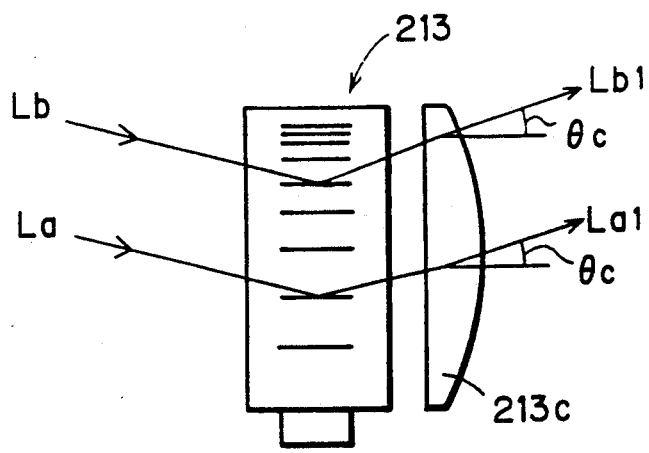
Figure 5:
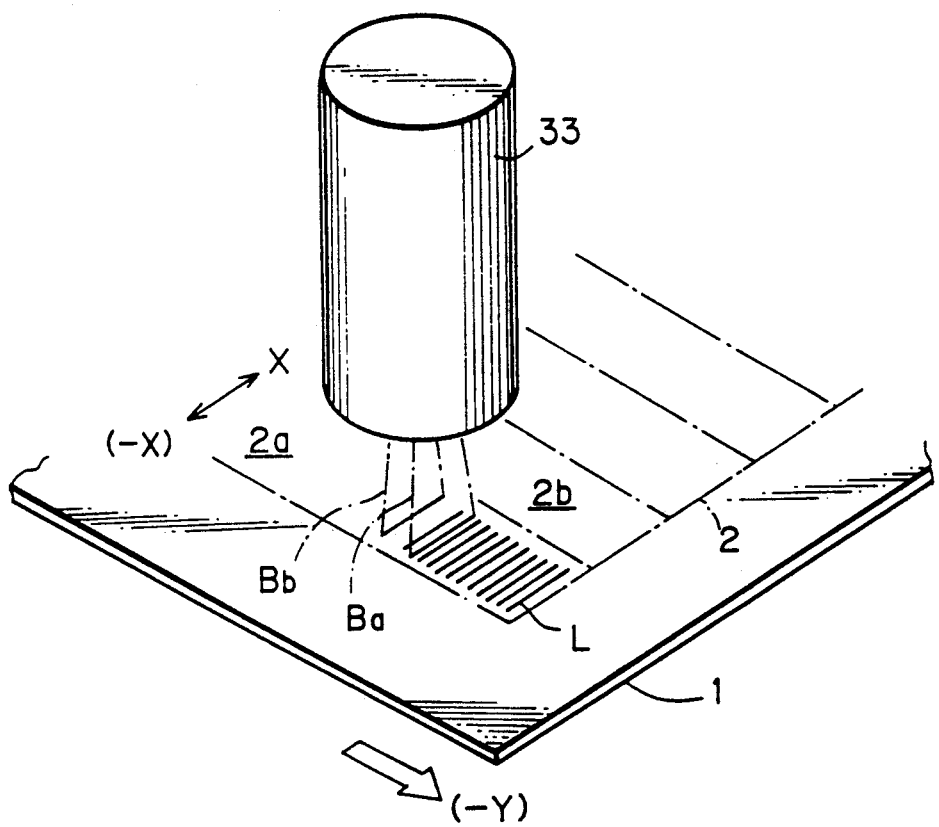
FIGS. 5 and 6(a)-6(g) are diagrams schematically showing a scanning method of the image forming system.

FIG. 5 schematically illustrates a drawing method in the drawing system 100. The drawing head 33 emits two laser beams $B_a$ and $B_b$ incident on the photosensitive material 1. The laser beams $B_a$ and $B_b$ are periodically deflected in the directions (X and −X), and are modulated as a function of a certain image signal. When the photosensitive material 1 is moved in the direction (−Y), scanning lines L extending in the directions (X and −X) are scanned with the laser beams $B_a$ and $B_b$. Since this optical beam scanning system 200 is a multibeam type, it performs the scanning operation according to the principle described before with reference to FIG. 1. However, a pitch of pixels and a spot size of the laser beams $B_a$ and $B_b$ can be separately changed in this system. Further, the inclination of scanning lines is not caused as described later. A drawing area 2 on the photosensitive material 1 is imaginarily divided into parallel stripes 2a, 2b, . . . , which are scanned in this order.

FIGS. 6(a)–6(g) illustrate relative movement of the photosensitive material 1 and the drawing head 33 in the scanning operation. An imaginary line $Y_0$ shows a course of the drawing head 33 in the directions (X and −X).

Figure 6:
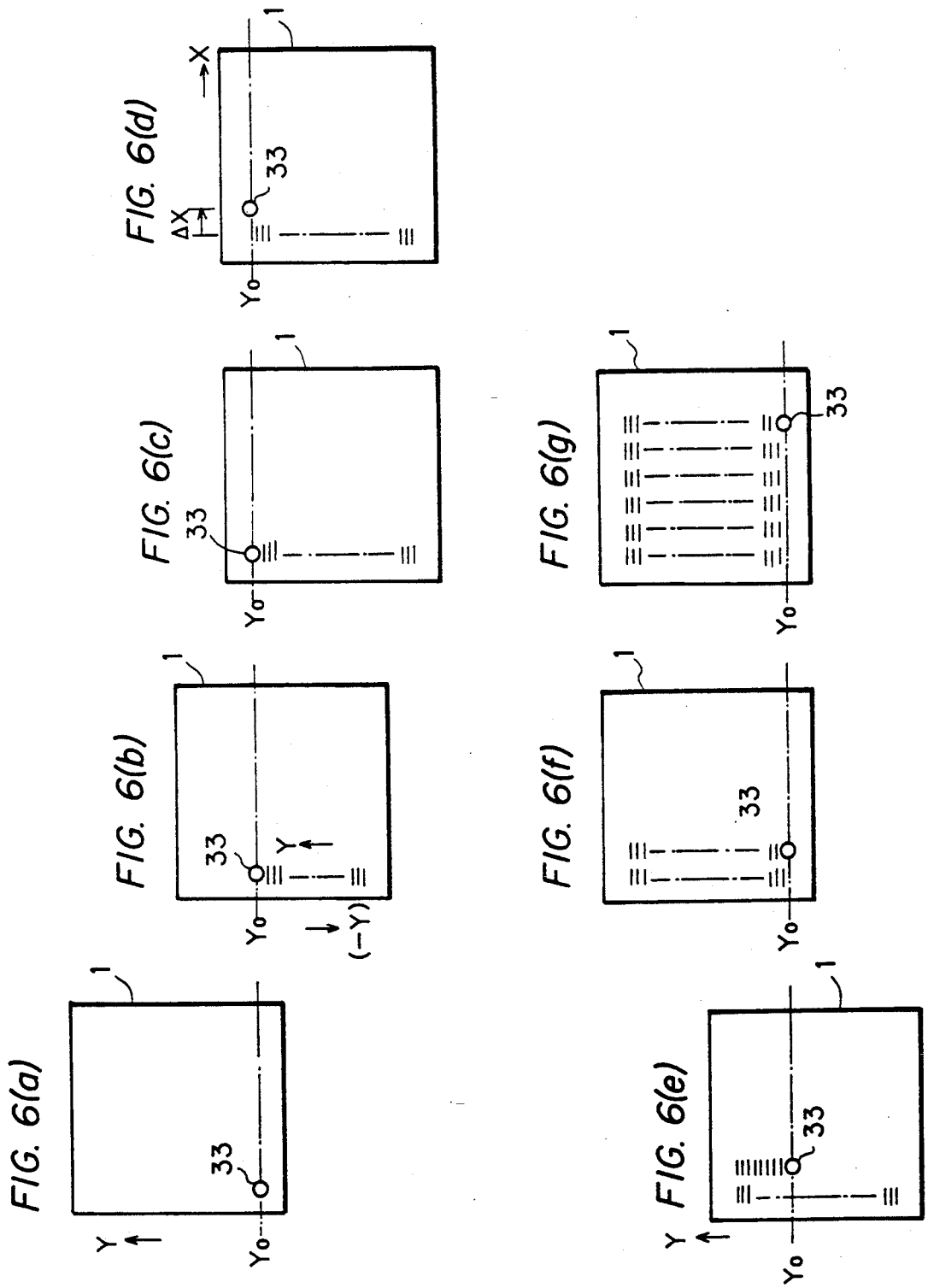

Firstly, as shown in FIG. 6(a), the drawing head 33 is positioned at an original point located at the lower left part of the photosensitive material 1.

At the start of scanning, the photosensitive material 1 is moved in the direction (−Y), whereby the first stripe is scanned in the direction Y, as shown in FIG. 6(b). FIG. 6(c) shows a state at the time when the photosensitive material 1 is fully moved in the direction (−Y). After this state, the drawing head 33 is moved by a prescribed distance ΔX in the direction X. The prescribed distance ΔX is equal to an interval between the stripes.

The second stripe 2b is scanned while the photosensitive material 1 is moved in the direction Y, as shown in FIG. 6(e). After scanning of the second stripe is finished as shown in FIG. 6(f), the reciprocating scanning is repeated as described above. As a result, the drawing area is scanned as shown in FIG. 6(g), whereby a desired image is recorded in the drawing area.

Figure 7:
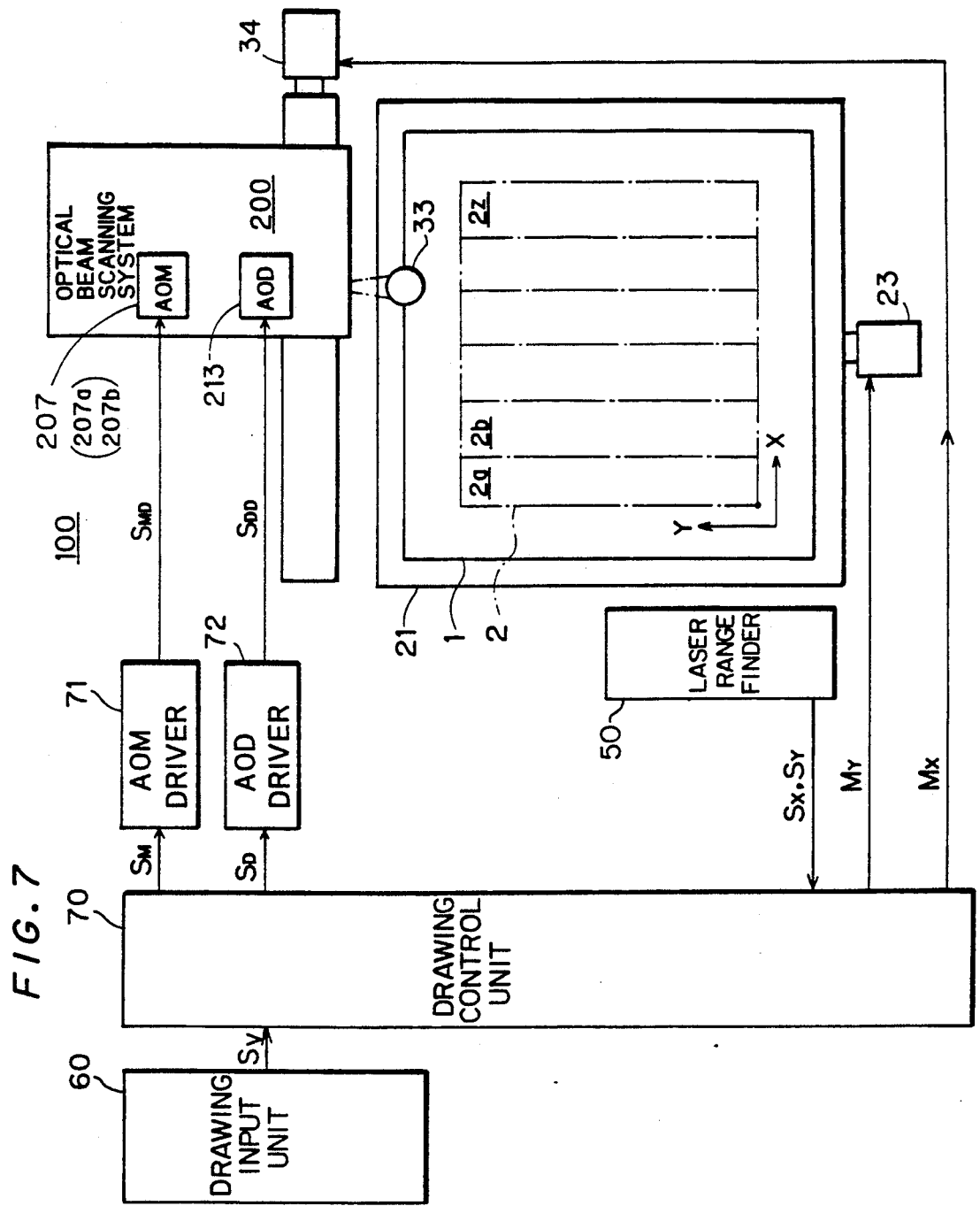
FIG. 7 is a schematic block diagram of the image forming system.

FIG. 7 is a block diagram of the drawing system 100. A drawing input unit 60, comprising a microcomputer and its peripheral equipment, generates vector data indicative of an outline of a figure to be drawn. The vector data are divided into divisional vector data $S_V$ corresponding to the respective stripes. The divisional vector data $S_V$ are supplied to the drawing control unit 70.

The drawing control unit 70 generates raster data with respect to each scanning line on the basis of the divisional vector data $S_V$. The raster data are supplied to an AOM driver 71 as an on-off modulation signal $S_M$. The AOM driver 71 converts the modulation signal $S_M$ into an AOM drive signal $S_{MD}$. Meanwhile, a deflection signal $S_D$ is supplied from the drawing control unit 70 to an AOD driver 72, and is converted into an AOD drive signal $S_{DD}$ by the AOD driver 72. These drive signals $S_{MD}$ and $S_{DD}$ are supplied to an AOM unit (or an acoustooptic modulator unit) 207 and an AOD (or an acoustooptic deflector) 213, respectively, which are included in the optical beam scanning system 200. Since the optical beam scanning system is a multibeam type, the AOM unit 207 have two AOM's 207a and 207b (not shown in FIG. 7), and each of the signals $S_M$ and $S_{MD}$ has two components for the two AOM's.

The drawing control unit 70 supplies a motor drive signal $M_X$ to the motor 34 which moves the optical beam scanning system 200 in the directions (X and −X), and another mirror drive signal $M_Y$ to the motor 23 which moves the optical beam scanning system 200 in he directions (Y and −Y). A laser range finder 50, which comprises the interferometer stated before, produces positional signals $S_X$ and $S_Y$ indicating the position of the suction table 21. The positional signals $S_Y$ and $S_X$ are supplied to the drawing control unit 70. The drawing control unit 70 generates the modulation signal $S_M$ and the deflection signal $S_D$ in synchronism with the positional signals $S_X$ and $S_Y$.

Figure 8:
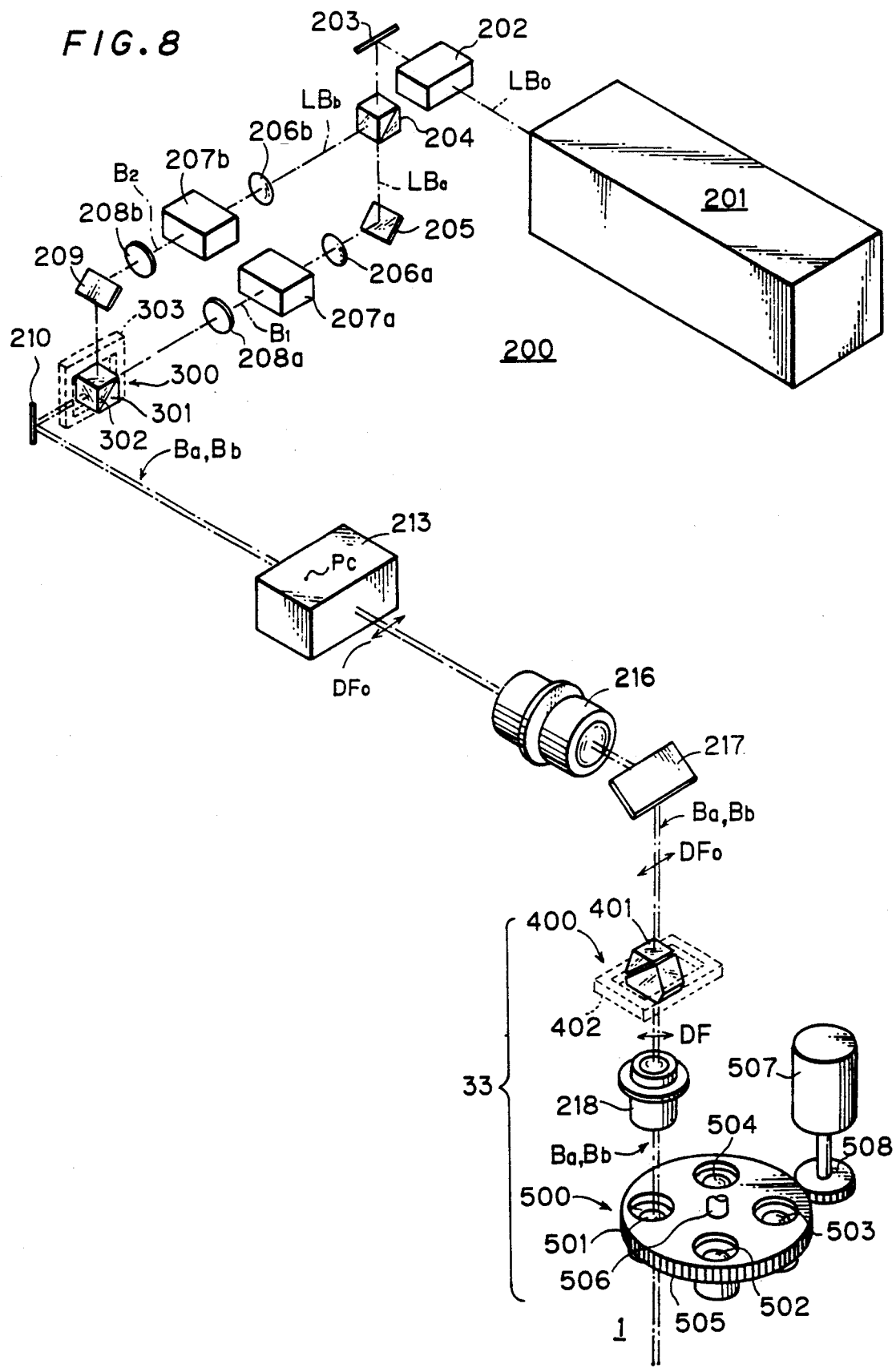
FIG. 8 is a perspective view of the optical beam scanning system.

FIG. 8 is a perspective view showing the internal structure of the optical beam scanning system 200. An $Ar^+$ laser 201 emits a single laser beam $LB_0$, which is supplied to an AOM 202 for correcting intensity of the laser beam. When a diameter of beam spots on the photosensitive material 1 is changed, the AOM 202 corrects the intensity of the laser beam to attain optimum exposure condition. Magnitude of the correction is experimentally found in advance on account of the characteristics of the photosensitive material 1, and an actual value of the correction is found with respect to a combination of a diameter of beam spots and a pitch of pixels. In general, the intensity is increased as the diameter of beam spots increases to maintain luminous energy per unit area.

The laser beam $LB_0$ leaving the AOM 202 is reflected by a mirror 203, and splitted into two laser beams $LB_a$ and $LB_b$ by a beam splitter 204. The first beam $LB_a$ is reflected by a mirror 205, passes through a condenser lens 206a, and is incident on the AOM 207a. The AOM 207a modulates the beam $LB_a$ in response to the first component of the AOM drive signal $S_{MD}$ to on-off control the beam $LB_a$. A modulated beam $B_1$ is collimated by a collimator 208a, and supplied to a multibeam adjuster 300 described later.

Meanwhile, the second beam $LB_b$ produced by the beam splitter 204 is supplied to the AOM 207b through a condenser lens 206a. The AOM 207b performs on-off modulation on the beam $LB_b$ in response to the second component of the AOM drive signal $S_{MD}$. A modulated beam $B_2$ is collimated by a collimator 208b, and supplied to the multibeam adjuster 300 after being reflected by a mirror 209. The two beams $B_1$ and $B_2$ are incident on the multibeam adjuster 300 perpendicularly to each other.

Incidentally, the two modulated beams may be produced by respective laser sources, such as semiconductor lasers, or by other means in the art. When semiconductor lasers are used, the AOM's 207a and 207b or other types of modulation means are not necessary because the semiconductor lasers can on-off control their own laser beams.

Figure 9:
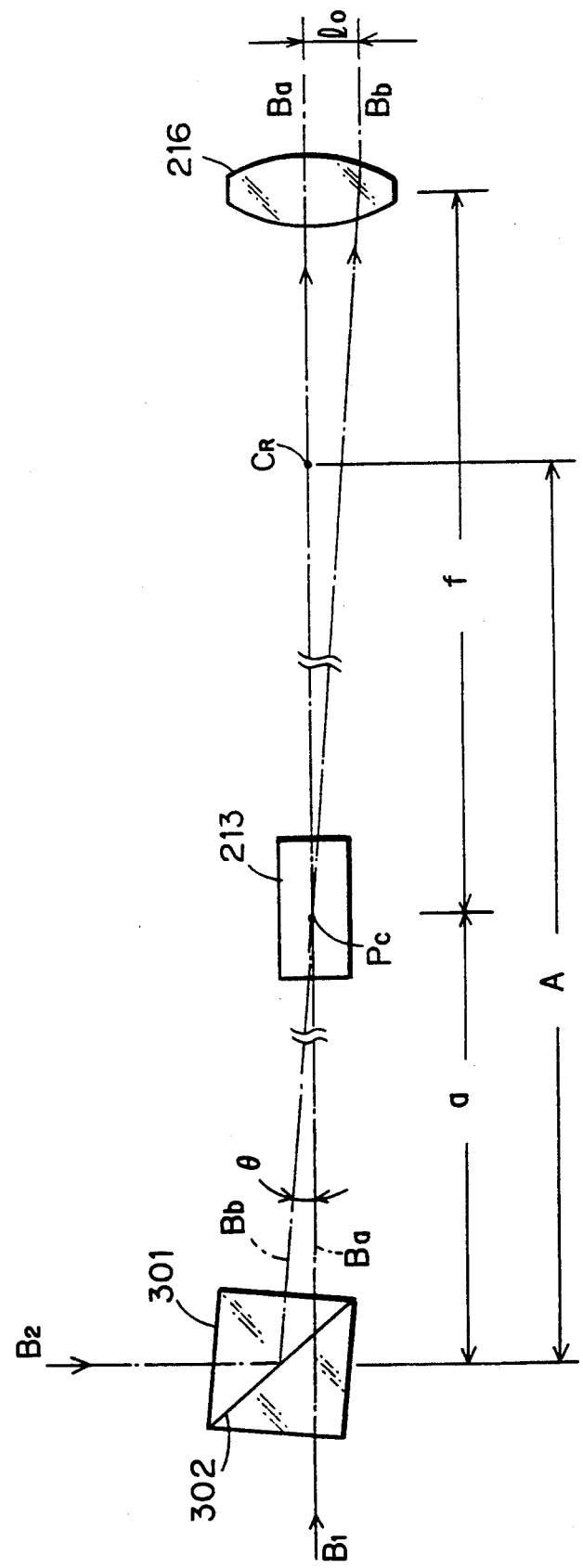
FIGS. 9 through 12 schematically illustrate a method of changing an intersection angle of optical beams with a beam direction turning element.

FIG. 9 is a diagram schematically showing a principle of turning a direction of light beams applied to the multibeam adjuster 300. The multibeam adjuster 300 comprises a beam direction turning element 301 as shown in FIG. 8. The beam direction turning element 301 has the same structure as a beam splitter and has a halfmirror surface 302. A part of the first beam $B_1$ passes straight through the halfmirror surface 302 to be a beam $B_a$ shown in FIG. 9. Meanwhile, a part of the second beam $B_2$ is reflected with the halfmirror surface 302 to be a reflected beam $B_b$. The two beams $B_a$ and $B_b$ intersect each other at a particular point $P_C$ at the image side of the element 301, which is given rotational displacement in advance according to a rule described later. The AOD 213 is placed at the intersection $P_C$ to cyclically deflect the beams $B_a$ and $B_b$. The beams $B_a$ and $B_b$ deflected by the AOD 213 are converted into parallel beams with a scan lens 216. A distance between the intersection $P_C$ and the scan lens 216 is set equal to a focal length f of the scan lens 216.

The reason why the beams $B_1$ and $B_2$ are converted into the beams $B_a$ and $B_b$ intersecting each other at the point $P_C$ is as follows: In order to independently change a pitch of pixels on a surface of the photosensitive material 1, the distance l between the two beam spots on the surface of the photosensitive material 1 is required to be changeable, as explained before referring to FIG. 1. For this purpose, a mechanism for changing a distance between the beams $B_a$ and $B_b$ is required in the optical beam scanning system 200.

However, if the beams $B_a$ and $B_b$ are made parallel to each other and a distance between the parallel beams is changed, the above stated purpose is not attained. That is, if the beams $B_a$ and $B_b$ are directly made parallel to each other, the parallel beams are converged at a same point after passing through the scan lens 216, and the pitch of pixels cannot be set at a desired value accordingly. In order to attain the above purposes, therefore, the two beams $B_a$ and $B_b$ are required to intersect each other.

The two beams $B_a$ and $B_b$ are made to intersect each other at the point $P_C$ on account of the following facts. Firstly, a diameter of an inlet side aperture of the AOD 213 is fairly small because a crystal used for the AOD element is small. Secondly, since a diameter of beam spots on the photosensitive material 1 decreases as a diameter of the beams B1 and B2 increases, the diameter of the beams $B_1$ and $B_2$ cannot be reduced if the diameter of beam spots on the photosensitive material is to be decreased. If the diameter of the beams $B_1$ and $B_2$ is set fairly large on account of the second fact while the two beams $B_1$ and $B_2$ are made to intersect each other, the two beams $B_1$ and $B_2$ cannot be introduced into the AOD 213 due the second fact when the intersection point is placed too far from the center of the AOD. Even if a polygon mirror is used in place of the AOD 213, it is difficult to construct the optical system so that the parallel beams are always reflected by a mirror surface of the polygon mirror because the mirror surface is not usually high enough.

In this embodiment, therefore, the beams $B_1$ and $B_2$ are converted into intersecting beams $B_a$ and $B_b$, and an angle $\theta$ of intersection is changed, whereby the distance $l_0$ between the parallel beams which are made parallel by the scan lens 216 is changed. Since the distance $l_0$ corresponds to a distance l between beam spots on the photosensitive material 1, the pitch of pixels is changed accordingly. The AOD 213 is placed at the intersection $P_C$ for the above stated reason. Even if the intersection angle $\theta$ is changed, the beams $B_a$ and $B_b$ are surely introduced into the AOD 213 accordingly. The intersection $P_C$ is not necessarily located at the center of the AOD 213, but it may be placed at the inlet aperture of the AOD 213. If a polygon mirror or a galvano mirror is used in place of the AOD 213, its mirror surface is positioned at the intersection $P_C$. The focal point of the scan lens 216 is posioned at the intersection $P_C$ so that the beams $B_a$ and $B_b$ become parallel beams at the image side of the scan lens 216 regardless of the intersection angle $\theta$.

The intersection angle $\theta$ is arbitrarily changed while the intersection $P_C$ is kept at the same position according to the following rules. In this embodiment, the intersection angle $\theta$ is changed by rotationally displacing the element 301 round a certain rotational center $C_R$. A reference position of the beam direction turning element 301 is set at the position where the element 301 is located when the halfmirror surface 302 is placed at a position 302a shown in FIG. 10. A distance A between the reference position of the element 301 and the rotational center $C_R$ depends on an optical path length a between the reference position and the intersection $P_C$.

Figure 10:
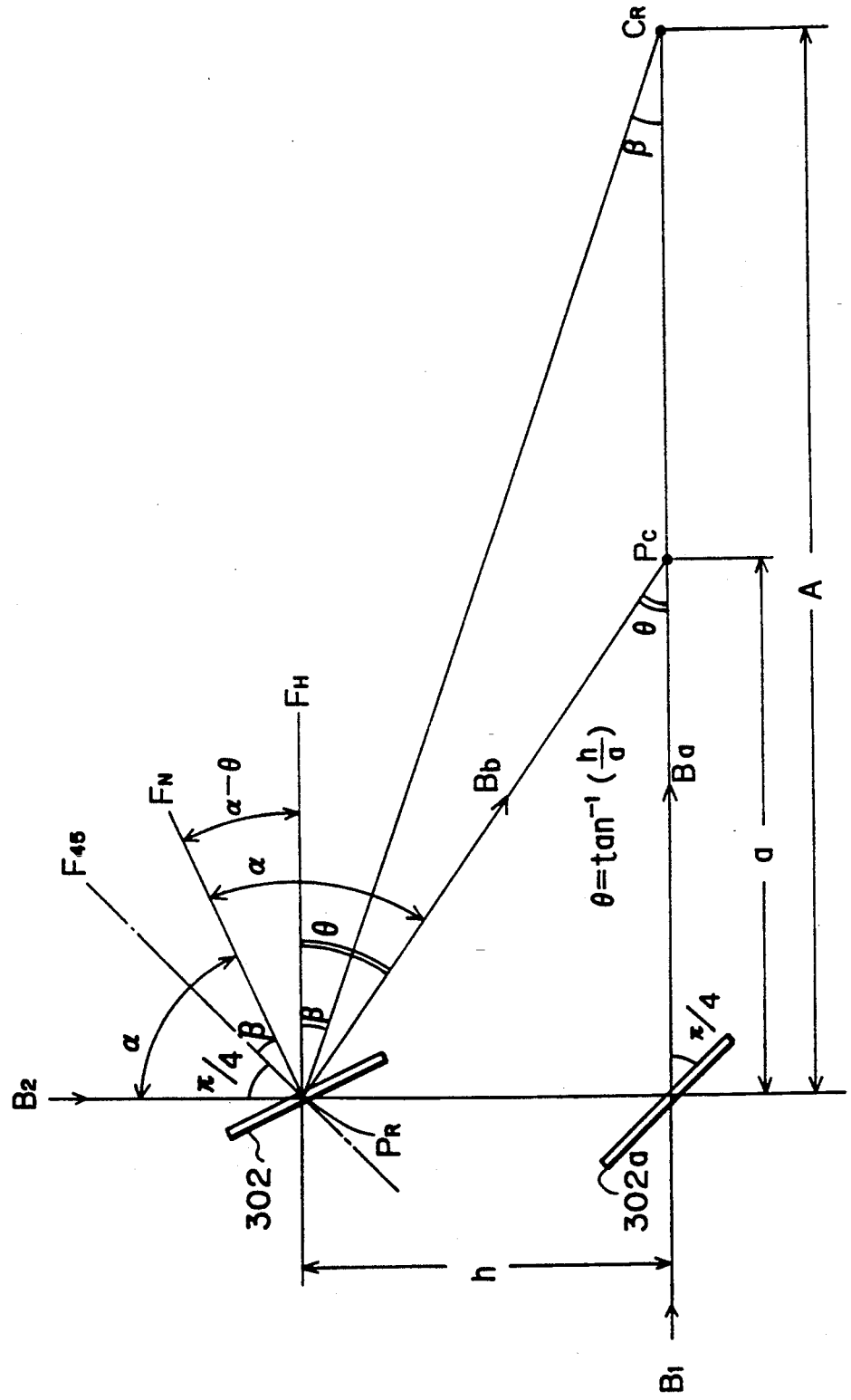

FIG. 10 schematically illustrates how to find the distance A. It is assumed that the element 301 (not shown) is rotated at an angle $\beta$ round the rotational center $C_R$, and that the beams $B_a$ and $B_b$ intersect each other at the intersection $P_C$ at the angle $\theta$. Symbols in FIG. 10 are defined as follows:

- $P_R$: a point on the halfmirror surface 302 at which the beam $B_2$ is reflected;
- $F_H$: a line parallel to the beam B1 drawn through the point $P_R$;
- $F_N$: a normal of the halfmirror surface 302;
- $F_{45}$: a line inclined at $\pi/4$ to a direction of the beam $B_2$ incident on the halfmirror surface 302;
- $\alpha$: an angle between the line $F_N$ and the direction of the incident beam $B_2$; and
- h: a height of the point $P_R$ from the optical path of the beam $B_1$:

An angle between the lines $F_N$ and $F_H$ is $(\alpha - \theta)$, and an angle between the line $F_H$ and the incident beam $B_2$ is $\pi/2$. Accordingly the following equation (6) holds:

$$(\alpha - \theta) + \alpha = \pi/2 \tag{6}$$

Since an angle between the lines $F_{45}$ and $F_H$ is $\pi/4$, the following equation (7) holds:

$$(\alpha - \theta) + \beta = \pi/4 \tag{7}$$

The following equation is given by eliminating $\alpha$ in the equations (6) and (7):

$$\beta = \theta/2 \tag{8}$$

Meanwhile the following equations (9) and (10) also hold:

$$\tan\beta = h/A \tag{9}$$

$$\tan\theta = h/a \tag{10}$$

The distance A is found by the equations (8) and (9):

$$\begin{aligned} A &= h/\tan\beta = h/\tan(\theta/2) \\ &= h(1-\cos\theta)^{\frac{1}{2}}/(1+\cos\theta)^{\frac{1}{2}} \end{aligned} \tag{11}$$

The following equation is obtained from the equation (10):

$$\cos\theta = \cos[\tan^{-1}(h/a)] \tag{12}$$

The following equation is obtained by substituting the left hand side of the equation (12) in the equation (11):

$$A = (a^2 + h^2)^{\frac{1}{2}} + a \tag{13}$$

The equation (13) shows that the distance A depends on the distance a. The values of the distance a and the height h are as follows, for example:

$$a = 300 \text{ mm} \tag{14}$$

$$h = 0.04 \text{ mm} \tag{15}$$

In the equation (13), the value h is negligible compared to the value a. Therefore the following approximation holds:

$$A \approx 2a \quad (16)$$

That is, the distance A between the rotational center $C_R$ and the reference position 302a is two times as long as the optical path length a between the reference position 302a and the AOD 213. The multibeam adjuster 300 is constructed so that it gives the rotational displacement to the element 301 according to the expression (16).

Figure 11:
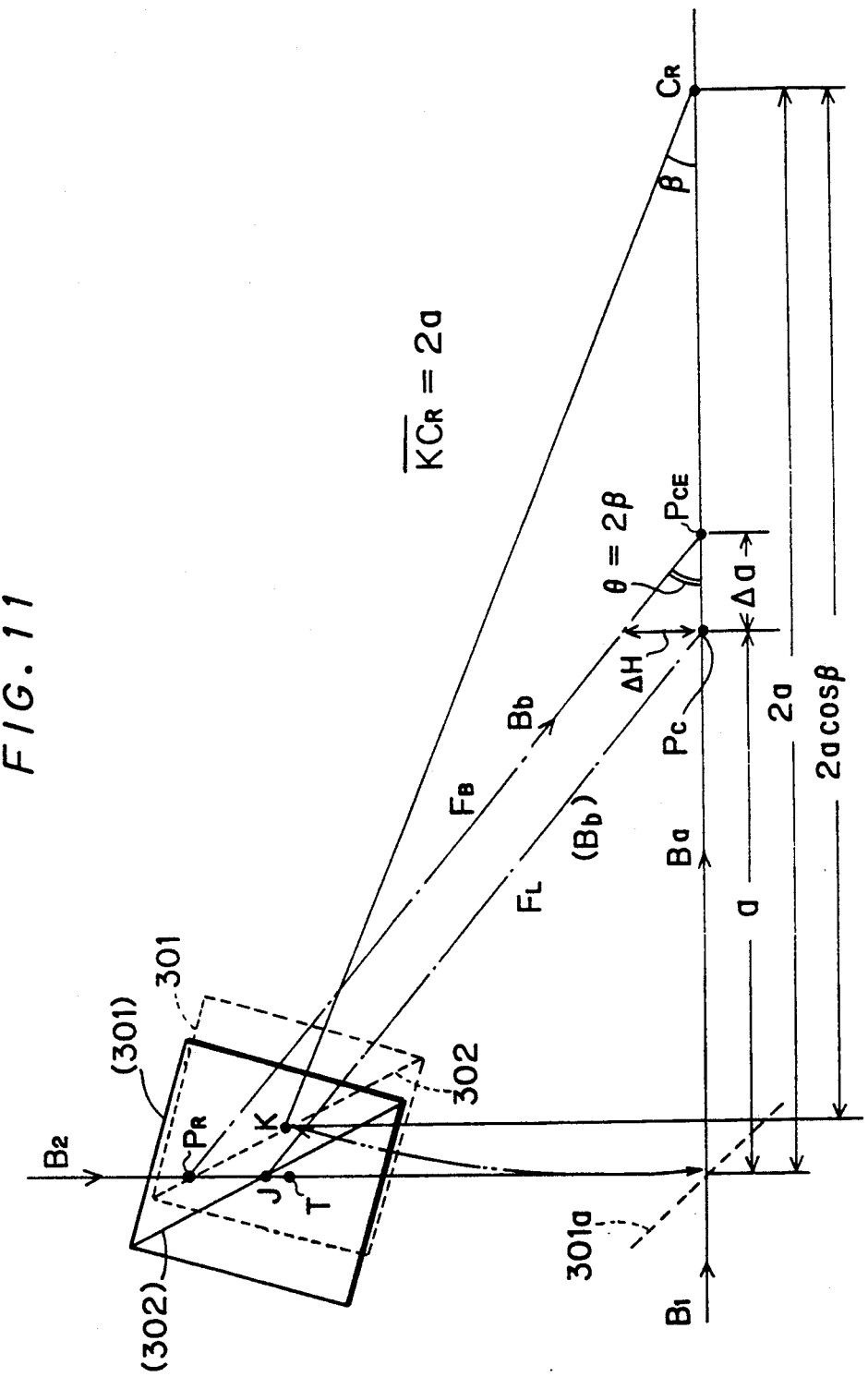
Figure 12:
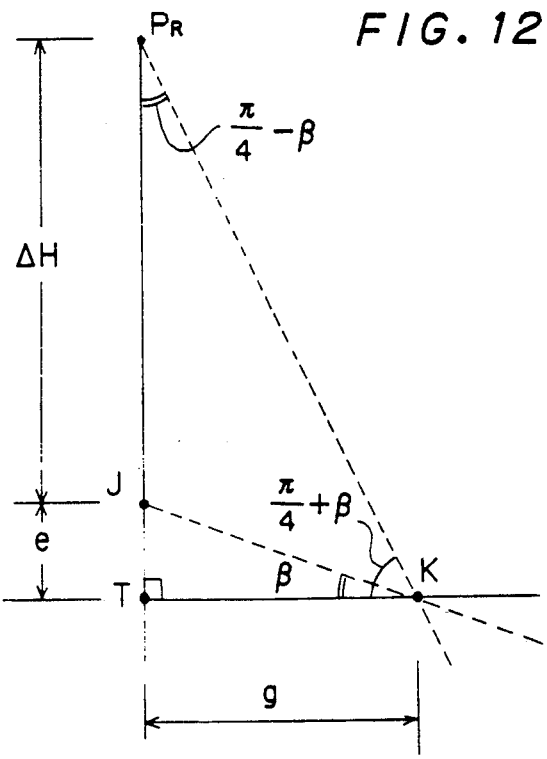

The element 301 is not displaced parallel upwardly, but is rotationally displaced round the rotational center $C_R$. The reflection point $P_R$ is therefore deviated from a center of the halfmirror surface 301 if the intersection angle $\theta$ is not zero. FIG. 11 exaggeratedly illustrates a case, drawn with solid lines, where the element 301 is moved parallel upwardly and rotated around its center. FIG. 11 also illustrates another case, drawn with broken lines, where the element 301 is rotated round the rotational center $C_R$. FIG. 12 is an enlarged view of a part of FIG. 11 near the reflection point $P_R$. Simbols in FIGS. 11 and 12 are defined as follows:

J: a central point of the halfmirror surface 302 of the element 301 drawn with solid lines;

K: a central point of the halfmirror surface 302 of the element 301 drawn with broken lines;

$P_{CE}$ (FIG. 11): an actual intersection point deviated by $\Delta a$ from an ideal intersection $P_C$ due to the difference between the central points J and K;

$F_L$: an optical path of the beam $B_b$ when the element 301 is placed at the position drawn with solid lines;

$F_B$: an optical path of the beam $B_b$ when the element 301 is placed at the position drawn with broken lines;

$\Delta H$: A distance between the optical paths $F_L$ and $F_B$ measured in the vertical direction;

T: a foot of the perpendicular from the point K to a line $P_R J$; and e, g: distances shown in FIG. 12.

The distance g is given by the following expression:

$$g = 2a - 2a \cos\beta = 2a(1-\cos\beta) \quad (17)$$

An angle $\angle P_R KT$ depends on the angle $\beta$ for rotation the halfmirror surface 302 as follows:

$$\angle P_R KT = \pi/4 + \beta \quad (18)$$

Therefore, the distance $\Delta H$ is given by the following equation:

$$\begin{aligned}\Delta H &= \overline{P_R T} - e \\ &= g \tan(\pi/4 + \beta) - g \tan\beta \\ &= g [\tan(\pi/4 + \beta) - \tan\beta] \\ &= 2a(1 - \cos\beta)(1 + \tan 2\beta)/(1 - \tan\beta)\end{aligned} \quad (19)$$

The following equation also holds as shown in FIG. 11:

$$\Delta a = \Delta H / \tan(2\beta) \quad (20)$$

The angle $\beta$ is set small so that the following approximation holds:

$$\tan\beta \approx \beta \quad (21)$$

$$\tan(2\beta) \approx 2\beta \quad (22)$$

$$\cos\beta \approx 1 - \beta^2/2 \quad (23)$$

The deviation $\Delta a$ is given by the following expression obtained from the expressions (19) through (23):

$$\Delta a \approx a\beta(1+\beta^2)/[2(1-\beta)] \quad (24)$$

By eliminating negligible terms in the expression (24), the following expression holds:

$$\Delta a \approx a\beta/2 \quad (25)$$

Now assuming that:

$$a = 300 \text{ mm} \quad (26)$$

$$h = 0.04 \text{ mm} \quad (27)$$

The angle $\beta$ is approximately given as follows:

$$\begin{aligned}\beta &\approx \tan\beta \\ &= h/(2a) \\ &= (2/3) \times 10^{-4}\end{aligned} \quad (28)$$

The value of the deviation $\Delta a$ is found from the expressions (25), (26) and (28) as follows:

$$\Delta a \approx 10^{-2} \text{ mm} \quad (29)$$

The deviation $\Delta a$ is negligibly small. That is, the error caused by the fact that the reflecting point $P_R$ is deviated from the center of the halfmirror surface 302 is negligible. In other words, when the element 301 is rotated round the rotational center $C_R$, which is settled by the relation that A=2a, the beams $B_a$ and $B_b$ always intersect each other at the point $P_C$. If the system is provided with a mechanism operable to drive the element 301 under the condition:

$$\beta = \tan^{-1}(h/A),$$

the beams Ba and Bb regorously intersect each other at the point $P_C$.

Figure 14:
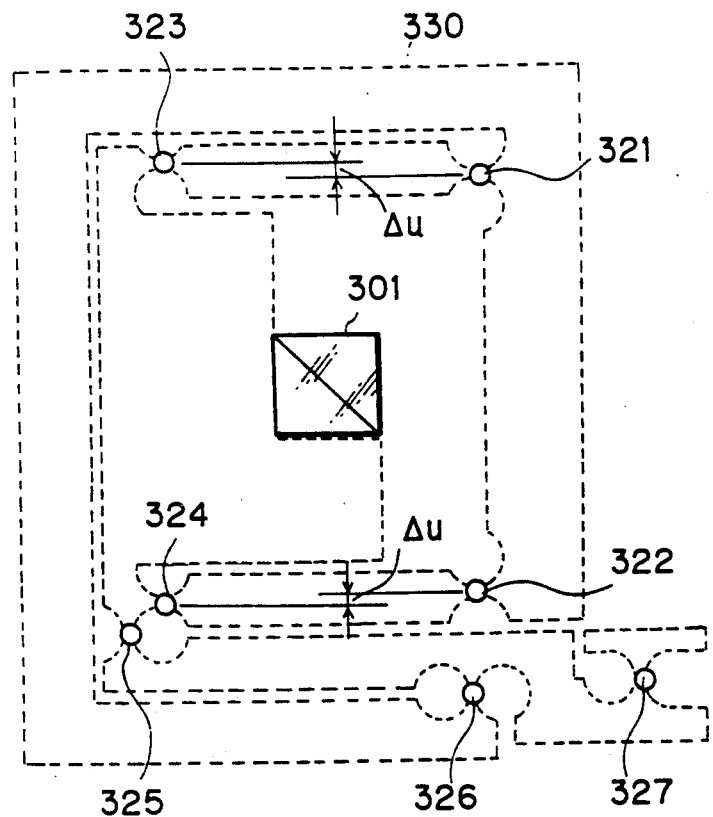
FIG. 14 is a side view of a multibeam adjuster.
Figure 13:
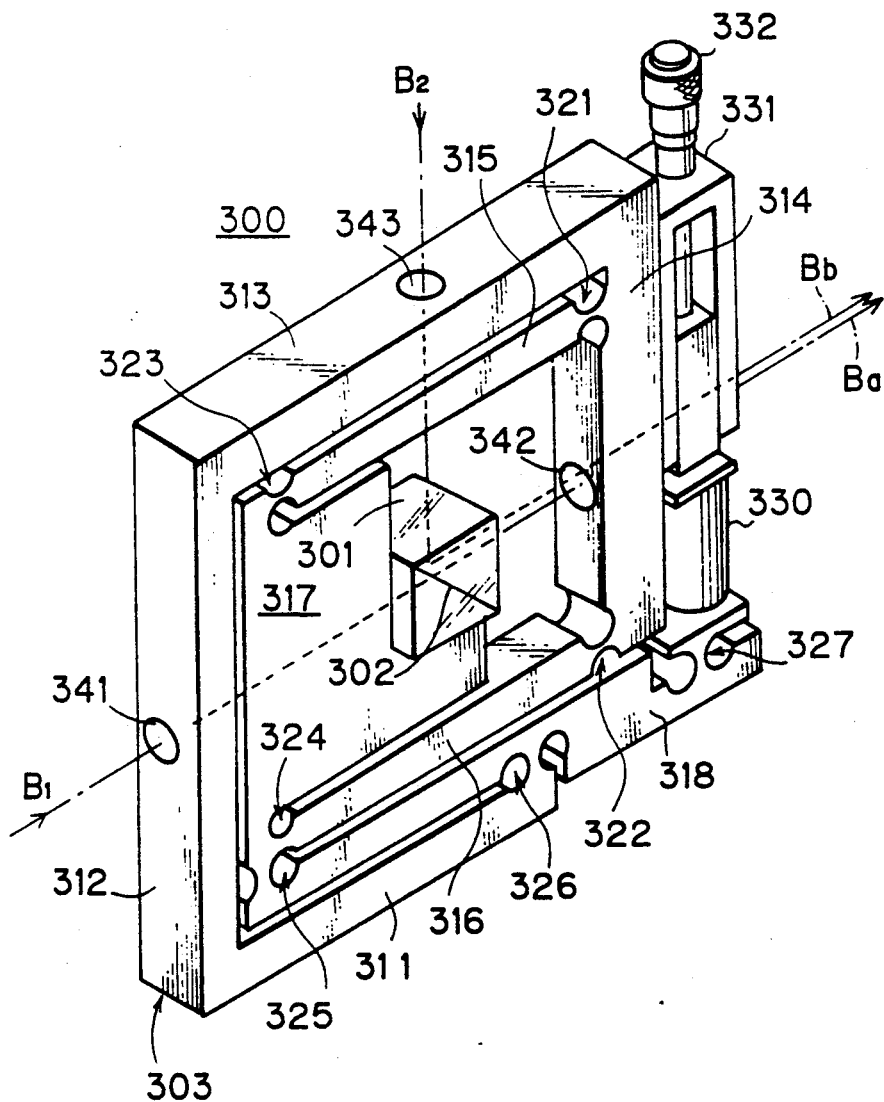
FIG. 13 is a perspective view of a multibeam adjuster.

FIG. 13 is a perspective view of the multibeam adjuster 300 constructed according to the above described principle. FIG. 14 is a schematical side view of the multibeam adjuster. The multibeam adjuster 300 comprises the beam direction turning element 301 and a notched link mechanism 303 of a monoblock type, which gives the rotational displacement to the element 301. The notched link mechanism 303 is fabricated by machining a single body such as a small metal block. The notched link mechanism 303 comprises frame members 311–314 as a supporting structure which is formed in a rectagular shape. The member 314 standing at the right hand side of FIG. 13 is linked with arm members 315 and 316 extending horizontally by notch projections 321 and 322, respectively. The left ends of the arm members 315 and 316 are linked with a center member 317 by notch portions 323 and 324, respectively.

A notch portion 325 is formed under the notch portion 324. The notch portion 325 is linked with an arm member 318 extending at its right hand side. The arm member 318 is linked with the frame member 311 by a notch portion 326. The right end of the arm member 318 is connected to a piezoelectric element 330 by a notch portion 327. The frame member 314 is further connected to a supporting member 331 for supporting a micrometer 332. The piezoelectric element 330 can be displaced in the vertical direction by operating the micrometer 332.

The beam direction turning element 301 is fixed on the center member 317. The first beam $B_1$ comes from the left hand side of FIG. 13, and passes through a through hole 341 formed through the frame member 312 and the center member 317. A part of the first beam $B_1$ passing straight through the halfmirror surface 302 of the elements 301 further passes through another through hole 342 formed through the frame member 314 and the supporting member 331, to thereby become the beam $B_a$. The second beam $B_2$ coming from the upper side passes through a through hole 343 formed through the frame member 313 and the arm member 315 to be incident on the halfmirror surface 302. A part of the beam $B_2$ which is reflected by the halfmirror surface 302 passes through the through hole 342 to thereby become the beam $B_b$.

Since the notch portions 321-327 have relatively small cross sections in the notched link mechanism 303, which is made of an elastic body, elastic distortions are caused only at the notch portions 321-327. In other words, the notched link mechanism 330 is a single link where the notch portions 321-327 function as link nodes and the members 315-318 function as link arms.

Figure 15:
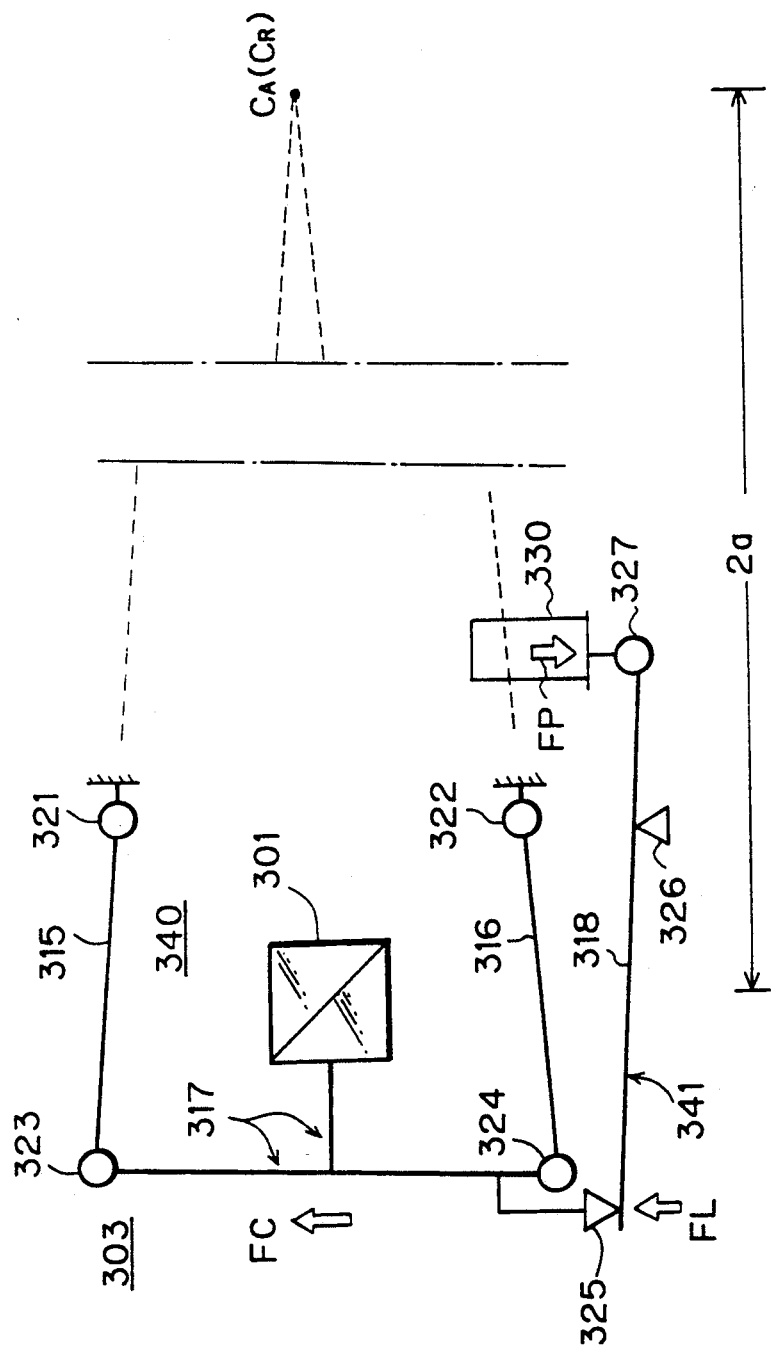
FIG. 15 is a diagram schematically showing mechanism of the multibeam adjuster.
Figure 16:
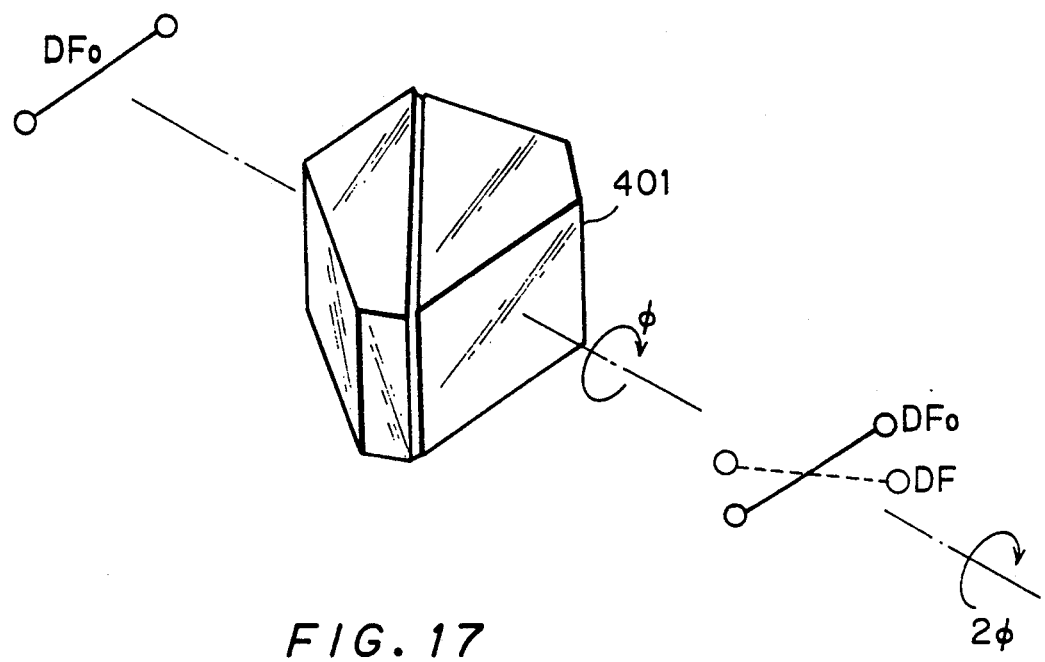
FIG. 16 is a perspective view of a pechan prism.

As shown in FIG. 14, vertical positions of the notch portions 321 and 323 are different by a distance $\Delta u$. The vertical positions of the notch portions 322 and 324 are also different by the distance $\Delta u$. FIG. 15 is a diagram schematically showing the function of the notched link mechanism 303. In FIG. 15, extended lines of the arm members 315 and 316 intersect at a point $C_A$. The members 315, 316 and 317 constitute a four-noded link mechanism 340, which is connected to a lever 341 whose fulcrum is the notch portion 326. Lengths of the members are so determined that a vertical displacement of the beam direction turning element 301 due to movement of the link mechanism 340 is negligible compared to the distance 2a. Accordingly, when the four-noded link mechanism 340 is operated, the center member 317, that is, the element 301 is rotated round the point $C_A$. If the notched link mechanism 303 is so designed that a distance between the element 301 and the point $C_A$ is set equal to the distance 2a stated before, the point $C_A$ corresponds to the rotational center $C_R$ shown in FIG. 9, and the element 301 is displaced rotationally as shown in FIG. 9.

The lever 341 is moved by the piezoelectric element 330. For example, when the piezoelectric element 330 expands to apply a downward force F to the notch portion 327, an upward force FL Is applied to the notch portion 325 positioned at the left end of the lever 341. Consequently a rotational force FC is applied to the center member 317, whereby the element 301 is displaced rotationally round the rotational center $C_A = C_R$. Incidentally, the micrometer 332 is used to coarsely adjust the initial position of the element 301.

A relation between the intersection angle $\theta$ and an amount $\Delta L_P$ of expansion (not shown) of the piezoelectric element 330 can be found in advance by means of an analysis according to a finite element method, for example. The notched link mechanism 300 is so constructed that the following equation holds:

$$\theta = 2\beta = 3.0 \Delta L_P \quad (30)$$

The amount $\Delta L_P$ of expansion for a desired intersection angle $\theta$ is found by the equation (30), and the piezoelectric element 330 is operated to cause the expansion accordingly.

Referring to FIG. 8, the beams $B_a$ and $B_b$ thus adjusted by the multibeam adjuster 300 are reflected by a mirror 210 and intersect each other at the intersection $P_C$ in the AOD 213. The state of the intersection is not drawn in FIG. 8 for convenience of illustration. The distance a defined in FIG. 9 corresponds to an optical path length from the element 301 to the AOD 213. In FIG. 8, the direction of the beams $B_a$ and $B_b$ is changed, and the rotational center $C_R$ shown in FIG. 9 exists on an extended line drawn through the multibeam adjuster 300 and the mirror 210.

The AOD 213 cyclically deflectes the two beams $B_a$ and $B_b$ in the deflection direction $DF_0$. The deflected beams $B_a$ and $B_b$ are incident on the scan lens 216 to become parallel beams, whose intervel depends on the intersection angle $\theta$. The parallel beams $B_a$ and $B_b$ are reflected by a mirror 217 and introduced into the drawing head 33.

Incidentally the size of the beams $B_a$ and $B_b$ adjusted by the multibeam adjuster 300 can be changed by beam expanders as described later. In that case, the positions of the rotational center $C_R$ and the AOD 213 are determined on account of the distortion of the beams caused by the beam expanders.

The drawing head 33 comprises a deflection direction adjuster 400 installed at its uppermost part. The deflection direction adjuster 400 comprises a pechan prism 401 and a prism rotation mechanism 402. As well known in the art, the pechan prism 401 is one of image rotating prisms. When the pechan prism 401 is rotated on its central axis, the image through the pechan prism rotates at an angle twice a rotational angle of the pechan prism. That is, when the pechan prism 401 is rotated at an angle $\phi$, the deflection direction $DF_0$ rotates at an angle $2\phi$, whereby a deflection direction at the image side of the pechan prism 401 becomes DF.

Figure 17:
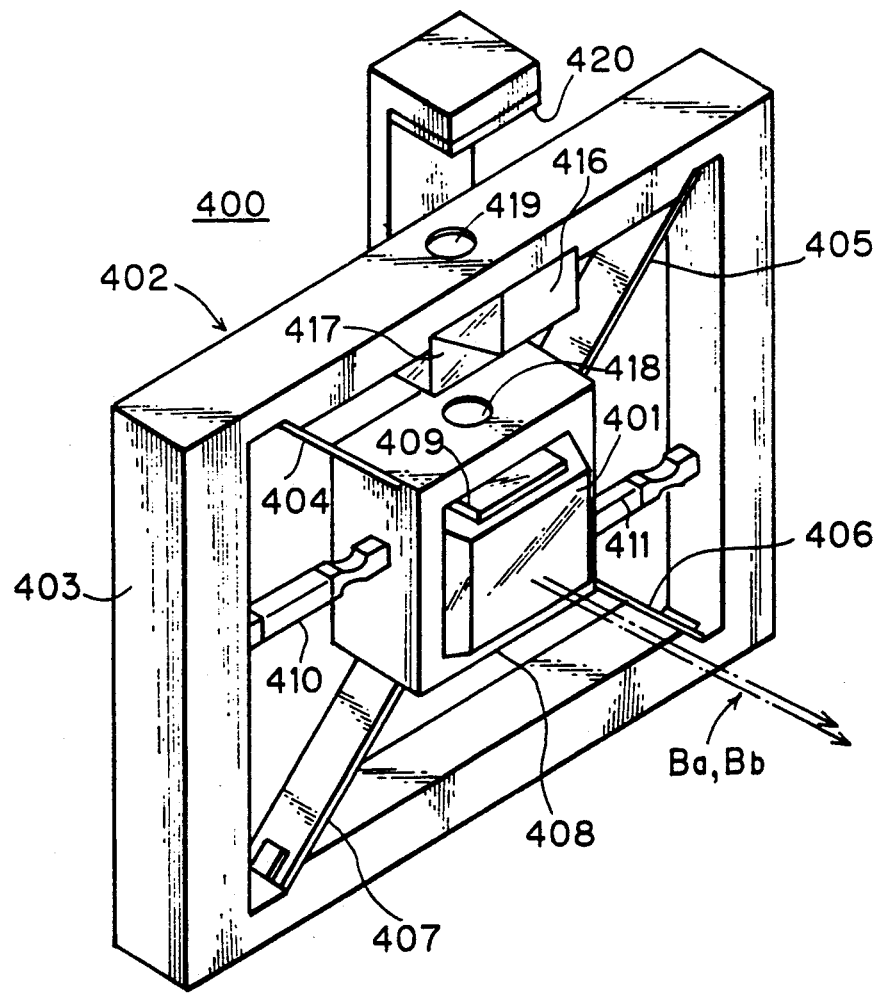
FIG. 17 is a perspective view of a deflection angle adjuster.
Figure 18:
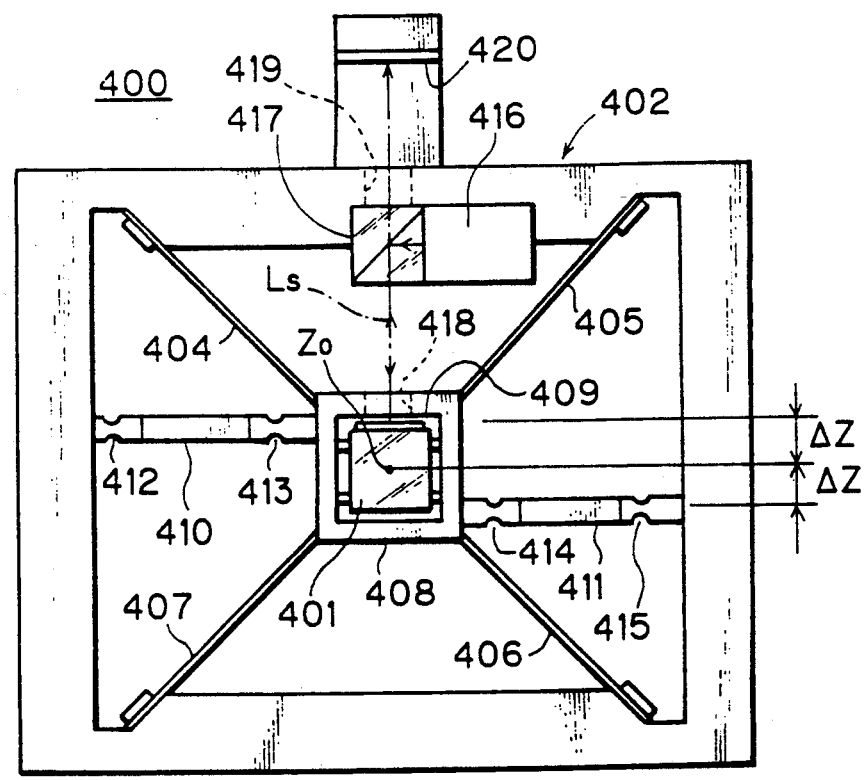
FIG. 18 is a front view of the deflection angle adjuster.

FIG. 17 is a perspective view of an example of the deflection direction adjuster 400, and FIG. 18 is its front view. The deflection direction adjuster 400 comprises the pechan prism 401 and a prism rotation mechanism 402. The prism rotation mechanism 402 is connected to the pechan prism 401 to rotate the same on the central axis of the pechan prism to thereby arbitrarily rotate the deflection direction of the beams $B_a$ and $B_b$.

The prism rotation mechanism 402 comprises an outer frame body 403 of a rectangular shape, leaf springs 404-407 which are supported by the outer frame body and which extend inwardly in a radial manner from the respective corners of the outer frame body, and an inner frame body 408 supported by the leaf springs. The pechan prism 401 is fixed in the inner frame body 408, and a mirror 409 is fixed on the upper surface of the pechan prism 401. Further, two piezeoelectric elements 410 and 411 are horizontally inserted between the outer and inner frame bodies 403 and 408. The piezoelectric elements 410 and 411 are provided with elastic members having notch portions 412-415 (shown in FIG. 18) at their both ends, respectively. As shown in FIG. 18, the piezoelectric element 410 is located a distance $\Delta z$ higher than the central point $Z_0$ of the pechan prism 401, and the piezoelectric element 411 is located the same distance ΔZ lower than the central point $Z_0$. Consequently, when the piezoelectric elements 410 and 411 are expanded by a same amount, they apply a couple of forces to the pechan prism 401, thereby rotating the pechan prism 401 on the central point $Z_0$. When drive signals to the piezoelectric elements 410 and 411 are made inactive, the pechan prism 401 returns to its initial position with its initial angle in response to the elastic forces of the leaf springs 404–407.

At the upper side of the outer frame body 403, a semiconductor laser 416 and a beam splitter 417 are fixed. A laser beam $L_S$ emitted from the laser 416 is reflected by the beam splitter 417, passes through a through hole 418, and reaches a mirror 409. The laser beam reflected by the mirror 409 goes upwardly, passes through the beam splitter 417 and a through hole 419, and reaches a PSD (or Position Sensing Device) 420 fixed above the outer frame body 403. When the pechan prism 401 is rotated at an angle $\phi$ by the piezoelectric elements 410 and 411, the angle $\phi$ is detected as a displacement of a light spot on the PSD 420.

Figure 19:
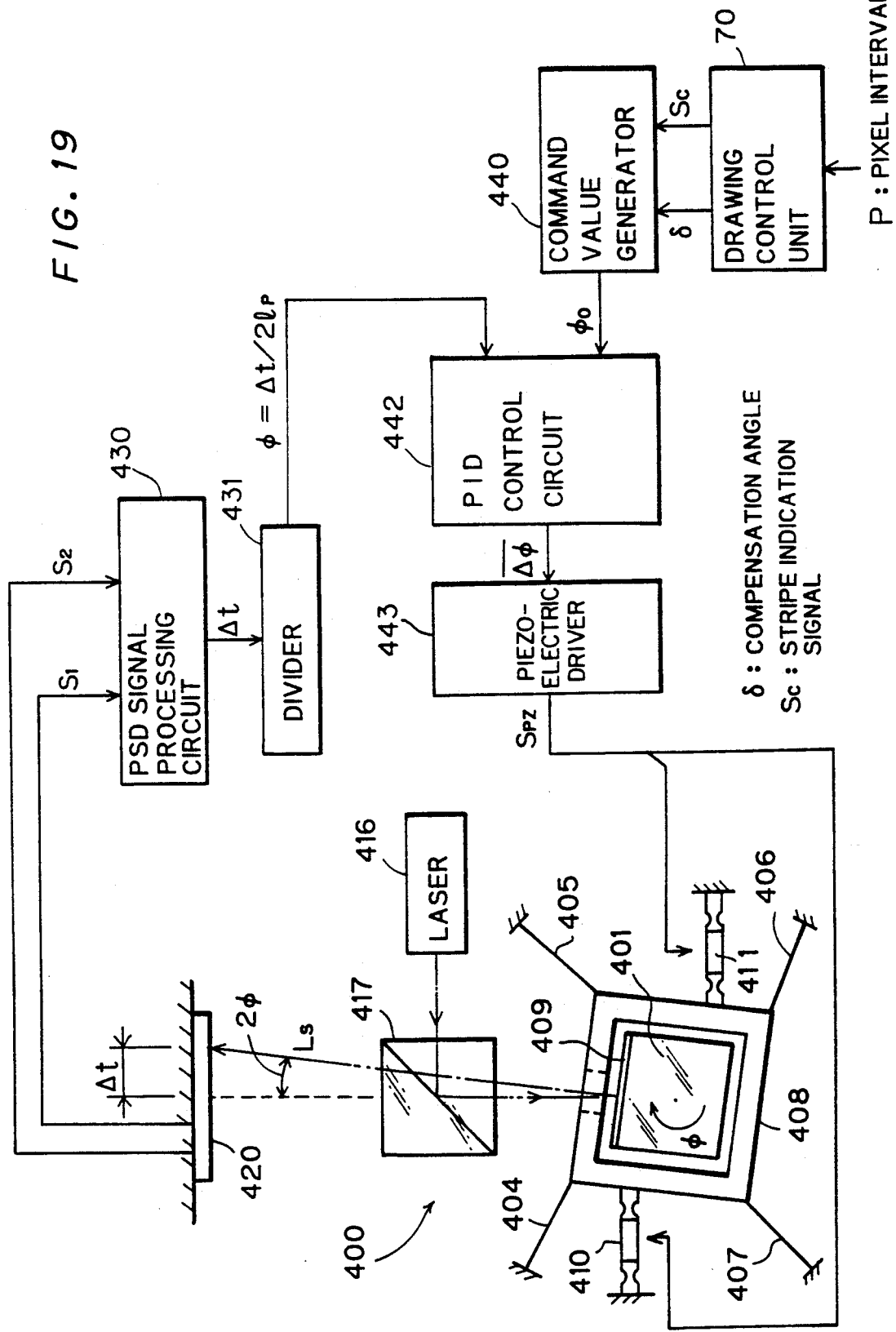
FIG. 19 is a block diagram of the deflection angle adjuster.

FIG. 19 is a block diagram of the deflection direction adjuster 400. Firstly, a desired value of a pixel pitch P is inputted into the drawing control unit 70. The drawing control unit 70 computes a compensation angle $\delta$ for compensating the inclination of scanning lines on the basis of the pixel pitch P. The compensation angle $\delta$ is given by the following expression:

$$\delta \approx (V_Y/V_X) \quad (31)$$

where $V_X$ is a deflecting speed of laser beams corresponding to the pixel pitch P, and $V_Y$ is a feeding speed of the photosensitive material.

The pixel pitch P and the speeds $V_X$ and $V_Y$ have the following relations:

$$V_X \times \tau_X = P \quad (32)$$

$$V_Y \times \tau_Y = 2P \quad (33)$$

where $\tau_X$ and $\tau_Y$ are clock cycles of scanning clocks in the directions X and Y, respectively. The pixel pitch P is changed by changing the values of $\tau_X$ and $\tau_Y$, for example. The drawing control unit 70 also produces a stripe indication signal $S_C$ indicating whether a stripe under drawing is specified with an odd oridinal number or an even oridinal number.

A command value generator 440 computes a rotational angle $\phi_0$ of the pechan prism on the basis of the compensation angle $\delta$. The angle $\phi_0$ is given by the following equation according to the principle of rotation of the deflection direction.

$$\phi_0 = \gamma(\delta/2) \quad (34a)$$

where the coefficient $\gamma$ is ($+1$) for an odd-numbered stripe and ($-1$) for an even-numbered stripe.

The PSD 420 outputs a pair of direction signals $S_1$ and $S_2$ shown in FIG. 19 from its pair of electrodes, as well known in the art. A well-known PSD signal processing circuit 430 computes a displacement $\Delta t$ of a light spot on a detection surface of the PSD on the basis of the detection signals $S_1$ and $S_2$. A divider 431 divides the displacement $\Delta t$ by $2l_P$, whether $l_P$ is a distance between the mirror 409 and the PSD 420, to thereby obtain the actual angle $\phi$ of rotation of the pechan prism 401. The divider includes two because a deflection angle of the detection beam $L_S$ is twice the angle $\phi$ of the pechan prism 401.

The actual angle $\phi$ and the command angle $\phi_0$ are supplied to a PID control circuit 442. The PID control circuit 442 produces a proportional signal, an integral signal, and a differential signal with respect to a difference ($\phi_0 - \phi$), and supplies a PID control signal formed as a combination of these three signals to a piezoelectric driver 443. The piezoelectric driver 443 produces a piezoelectric drive signal $S_{PZ}$, and supplies the same to the piezoelectric elements 410 and 441 to expand or contract them by a same amount.

The rotational angle $\phi$ of the pechan prism 401 becomes equal to the command value $\phi_0$ according to the closed loop control described above. Since influence on the rotational angle due to the hysteresis of the piezoelectric elements is simultaneously eliminated, the deflection direction of the beams $B_a$ and $B_b$ rotates at the angle $\delta$ ($=2\phi_0$). Incidentally, the deflection direction adjuster 400 may be controlled in a manner of open loop. In this case, the piezoelectric drive signal $S_{PZ}$ is preferably reset at zero to return the piezoelectric elements 410 and 411 to their initial states every time when the angle $\phi$ is to be changed in order to elimenate an effect of the hysteresis.

Figure 20:
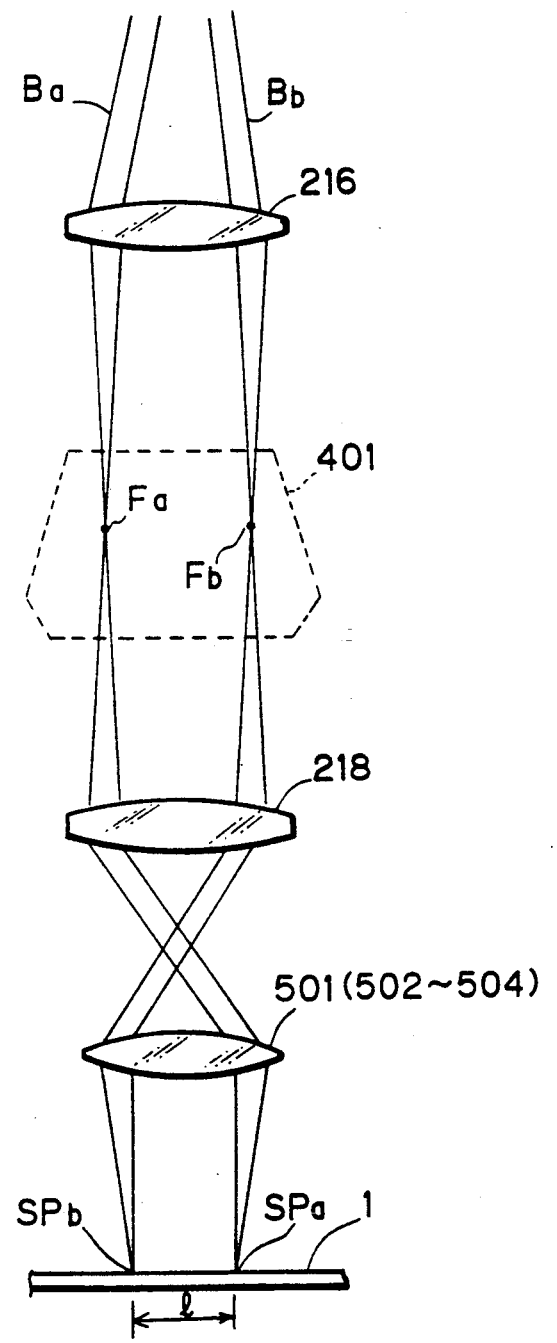
FIG. 20 is a diagram showing light paths of laser beams inside the optical beam scanning system.

Referring to FIG. 8 again, the beams $B_a$ and $B_b$ with its deflection direction rotated pass through a relay lens 218 and reach a variable focusing mechanism 500. FIG. 20 schematically illustrates the function of the relay lens 218. The pechan prism 401 is not drawn but only its position is shown in FIG. 20, for convenience of illustration, and the mirror 217 shown in FIG. 8 is omitted. As shown in FIG. 20, the beams $B_a$ and $B_b$ leaving the scan lens 216 are parallel to each other, and each of the beams is a convergent bundle of rays converging at convergence points $F_a$ and $F_b$, respectively. The pechan prism 401 is placed at the convergence points $F_a$ and $F_b$. The pechan prism 401 may be placed at other position after the AOD 213 while taking account of an optical path length of the pechan prism. The beams $B_a$ and $B_b$ are made to intersect each other by a relay lens 218, and focused on the photosensitive material 1 by an object lens 501 (or either of object lenses 502–504) described later. The two laser lenses 216 and 218 are used in this embodiment to increase degrees of freedom in the system design.

The variable focusing mechanism 500 comprises object lenses 501–504 whose focal lengths are different from each other. The object lenses 501–504 are supported by a lens holder 505 of a disc shape having holes for the object lenses. An outer surface of the lens holder 505 is made a gear, which is engaged with a driving gear 508. The driving gear 508 is rotated by a drive motor 507, thereby rotating the lens holder 505 on its axis 506.

When one of the object lenses (501 for example) in the lens holder 505 of a turret type is selected, the selected lens 501 is moved to the position at which the beams $B_a$ and $B_b$ goes through. The beams $B_a$ and $B_b$ are focused on the photosensitive material 1 by a specific minification of the selected object lens 501. When other object lens 502 is selected, the size of the spots $SP_a$ and $SP_b$ of the beams $B_a$ and $B_b$ is changed as well as the distances l between the spots. According to this embodiment, the size of the spots $SP_a$ and $SP_b$ can be set at one of four values particular to the object lenses 501–504.

Incidentally, the combination of the scan lens 217 and the relay lens 218 or the combination of the relay lens 218 and the object lens may be replaced by another optical system, such as a zoom lens, which can vary its focal length.

According to the above embodiment, the size of the spots $SP_a$ and $SP_b$ and their distance l can be changed as follows by selecting one of the object lenses in the variable focusing mechanism 500:

the size: $d_1 \rightarrow d_2$ the distance $l_1 \rightarrow l_2$

The distance $l_2$ can be separately returned to the value $l_1$ with the multibeam adjuster 300 by adjusting the intersection angle $\theta$. As a result, the spot size can be changed separately from the distance l. On the other hand, if the intersection angle $\theta$ is changed while the selected object lens is not changed, only the distance l is changed; thus the pixel pitch is changed separately from the spot size.

Figure 21A:
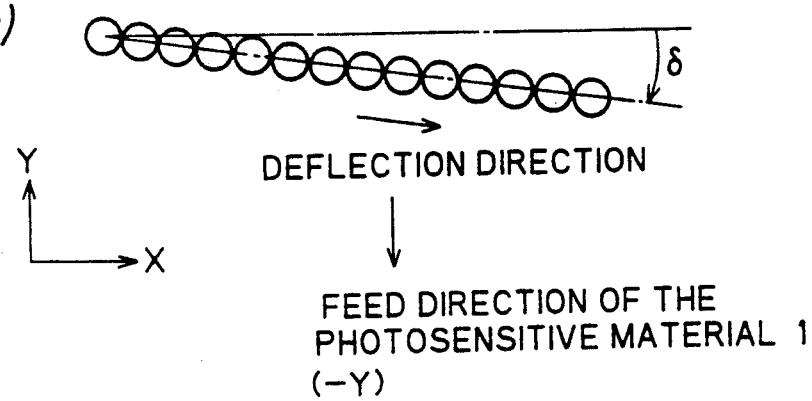
FIGS. 21(a)-21(c) illustrate a method of compensating inclination of scanning lines.
Figure 21B:
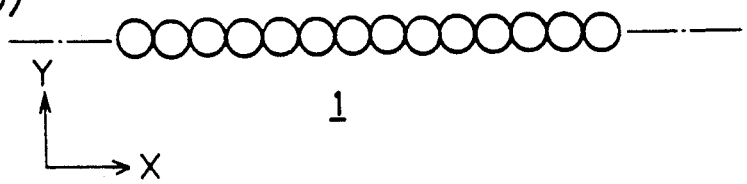
Figure 21C:
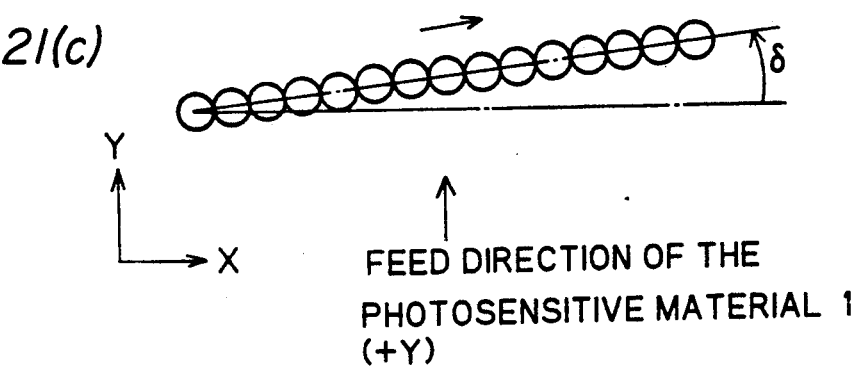

When the photosensitive material 1 is moved in the direction $(-Y)$, as shown in FIG. 21(a), the deflection direction adjuster 400 changes the deflection direction by the angle $\delta$ measured clockwise from the X axis. The inclination of the scanning lines on the photosensitive material 1 is corrected accordingly, and the scanning lines are arrayed parallel to the direction X, as shown in FIG. 21(b). On the other hand, when the photosensitive material 1 is moved in the direction $(+Y)$, as shown in FIG. 21(c), the sign of the compensation signal $\delta$ is reversed to obtain the parallel scanning lines shown in FIG. 21(b). When the scanning speed is changed accompanied with a change of the pixel pitch, the value of the compensating angle is changed accordingly.

Figure 22A:
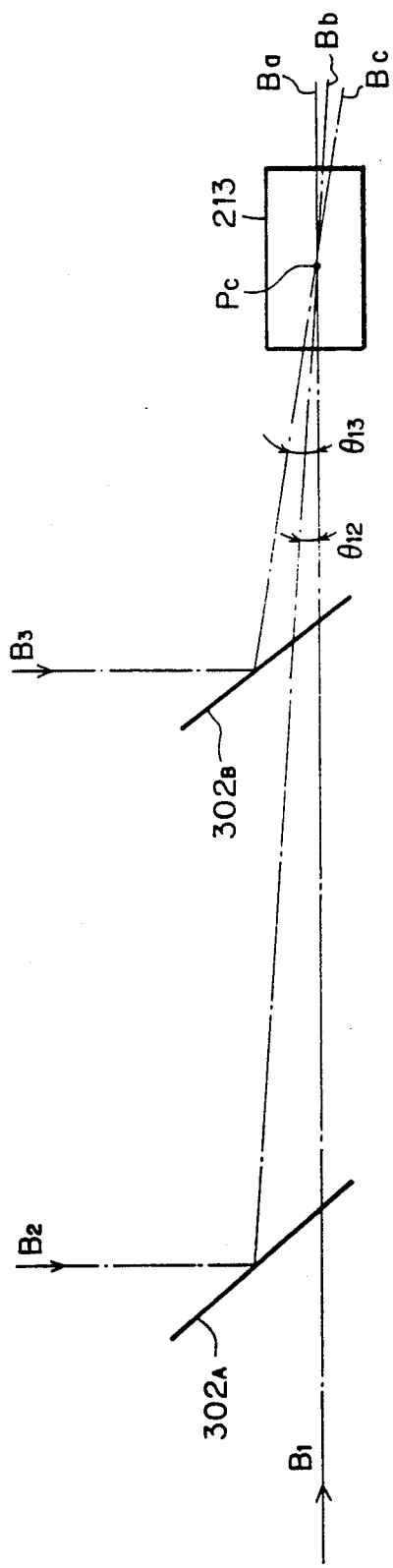
FIGS. 22A and 22B schematically illustrate a method of changing intersection angles of three laser beams.

The present invention can be applied to an apparatus utilizing more than three laser beams. FIG. 22A illustrates a method of converting three beams $B_1$–$B_3$ into intersecting beams $B_a$–$B_c$. The directions of the beams $B_2$ and $B_3$ are changed by respective beam-direction changing element (not shown) having halfmirror surfaces $302_A$ and $302_B$. Further, two link mechanisms, which are the same as the notched link mechanism 330 shown in FIG. 13, are used to separately displace between the intersection $P_C$ and the halfmirror surface $302_A$ is different from that between the intersection $P_C$ and the halfmirror surface $302_B$, a distance between the halfmirror surface $302_A$ and its rotational center is set different from that between the halfmirror surface $302_B$ and its rotational center accordingly.

Figure 22B:
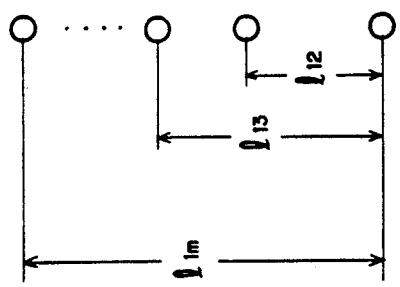

When at least three beams are used, intervals between the beam spots on the photosensitive material 1 are not necessarily equal to each other. In general, when m pieces of beams are used where m is an integer more than two, distances $l_{12}, l_{13}, \ldots, l_{1m}$ from a first beam spot to respective beam spots on the photosensitive material 1 known in FIG. 22B are set to hold the following equation:

$$l_{ij} = [mI_j + (j-1)]P \quad (34b)$$

where j is an integer from 2 to m, and $I_j$ is a natural number. If the equation (34b) is satisfied, the drawing area is fully scanned by moving the photosensitive material 1 by a distance m times the pixel pitch P for each beam deflection operation. This method is based on a principle that an i-th scanning line among m scanning lines, where i is an integer from 1 to m, is scanned by an i-th optical beam. If the equation (34b) is satisfied, the distances between the beam spots can be arbitrarily changed.

Figure 23:
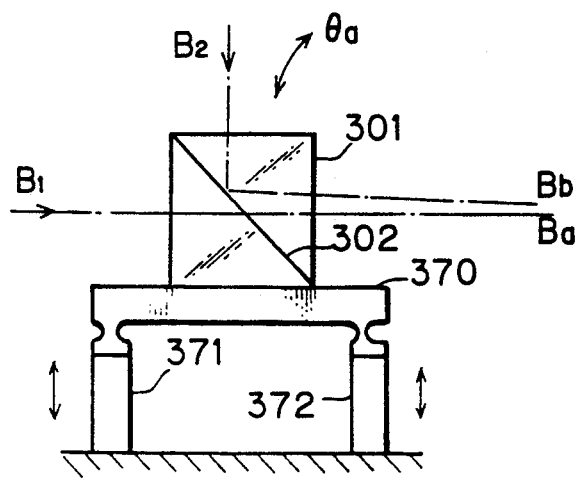
FIGS. 23 and 24 are front views showing other types of the deflection angle adjuster.

The multibeam adjuster 300 may have other structure which can rotationally displace the beam direction turning element 301. FIG. 23 is a front view of an example of other types of the multibeam adjuster. This multibeam adjuster comprises a stage 370 and piezoelectric elements 371 and 372. The element 301 is fixed on the stage 370, and the stage 370 is supported by the piezoelectric elements 371 and 372 at notched link portions formed at the lower side of the stage 370. If amounts of expansion of the piezoelectric elements 371 and 372 are different from each other, the element 301 is rotationally displaced in a direction $\theta_a$ shown in FIG. 23.

Figure 24:
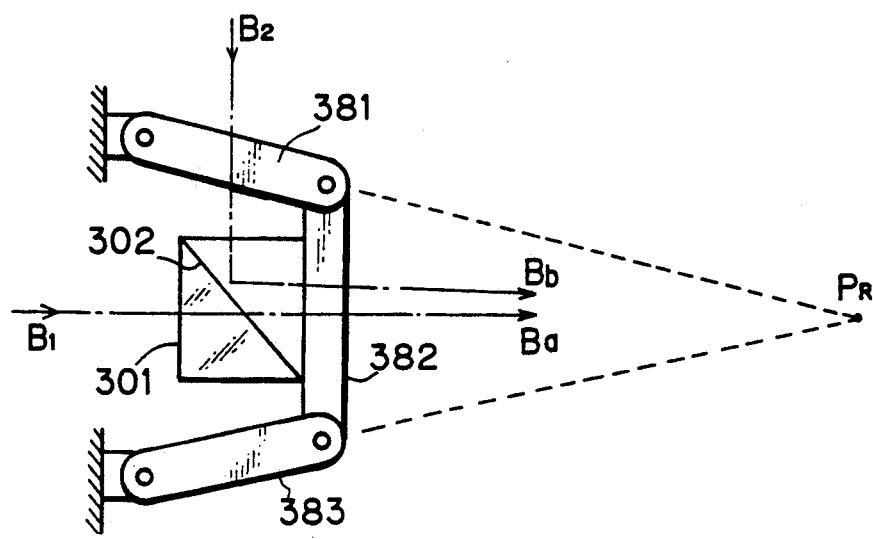

FIG. 24 is a front view of another example of the multibeam adjuster. The multibeam adjuster comprises a four-node link mechanism having three arms 381–383 linked with each other. The element 301 is rotationally displaced round a point $P_R$ at which extended lines of the arms 381 and 383 intersect each other.

Figure 25:
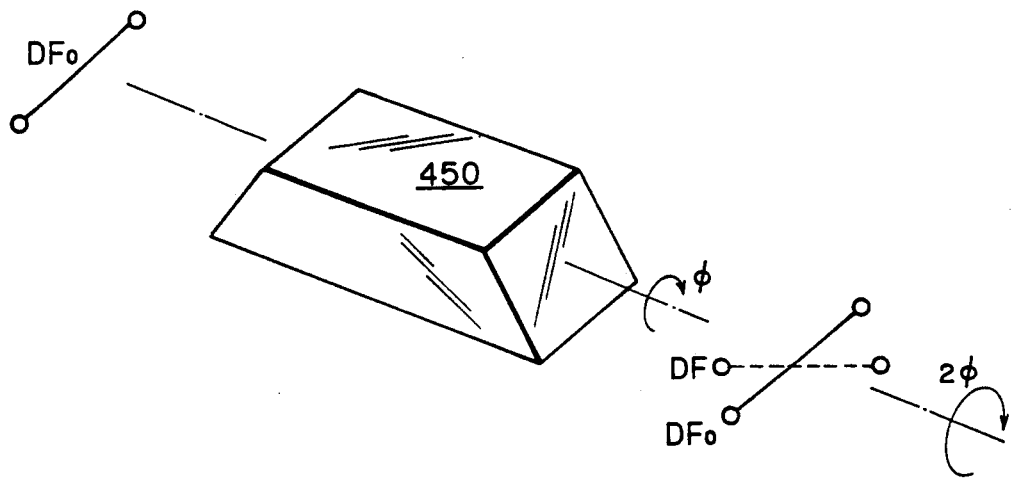
FIG. 25 is a perspective view of a dove prism.
Figure 26:
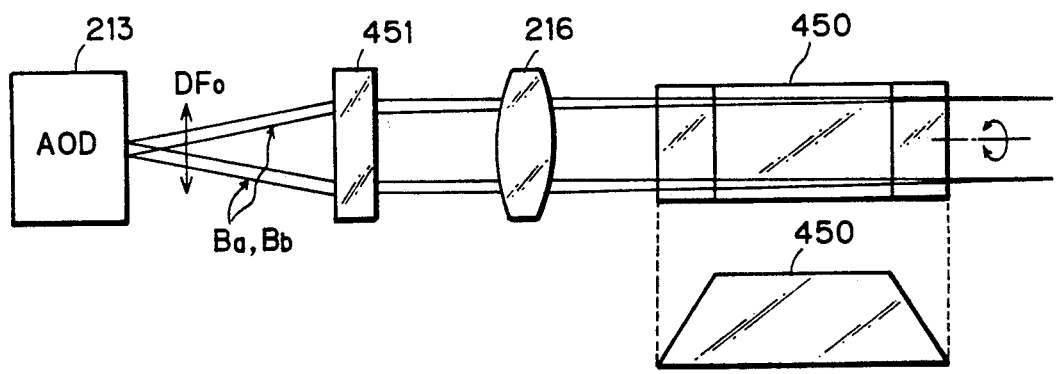
FIGS. 26 through 32 illustrate other types of the deflection angle adjuster.

As an image rotating prism, a dove prism 450 shown in FIG. 25 is well known as well as the pechan prism. The deflection direction DF is changed by rotating the dove prism 450 on its central axis with the prism rotating mechanism shown in FIG. 17. When a convergent beam passes through the dove prism, the astigmatism is caused. In order to correct the astigmatism, the deflection direction adjuster having the dove prism 450 is preferably located between a beam expander (not shown) placed at the image side of the AOD 213 and the scan legs 216 shown in FIG. 8. If the deflection direction adjuster having the dove prism 450 is located at the image side of the scan lens 216, an astigmatism correction lens 4561 is placed at the object side of the scan lens 216, as shown in FIG. 26. Since the pechan prism 401 does not cause the astigmatism, it can be placed at any position between the AOD 213 and the variable focusing mechanism 500.

Figure 27:
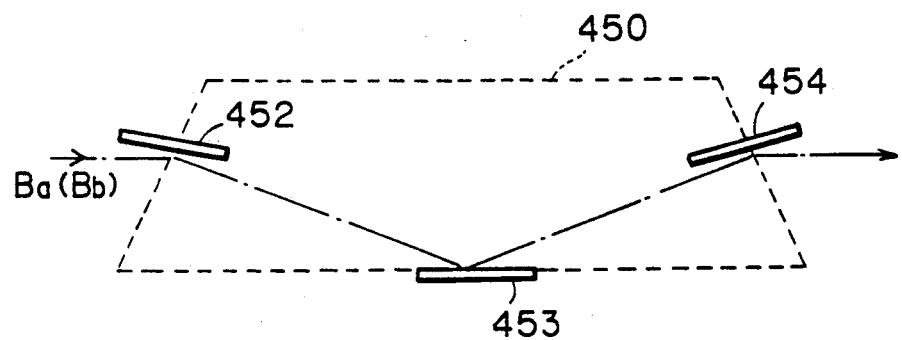

The dove prism 450 is equivalent to three mirrors 452–454 shown in FIG. 27. The three mirrors can be therefore used in place of the dove prism. In this case, the three mirrors are rotated as a whole while the positional relation among the three mirrors are maintained.

Figure 28:
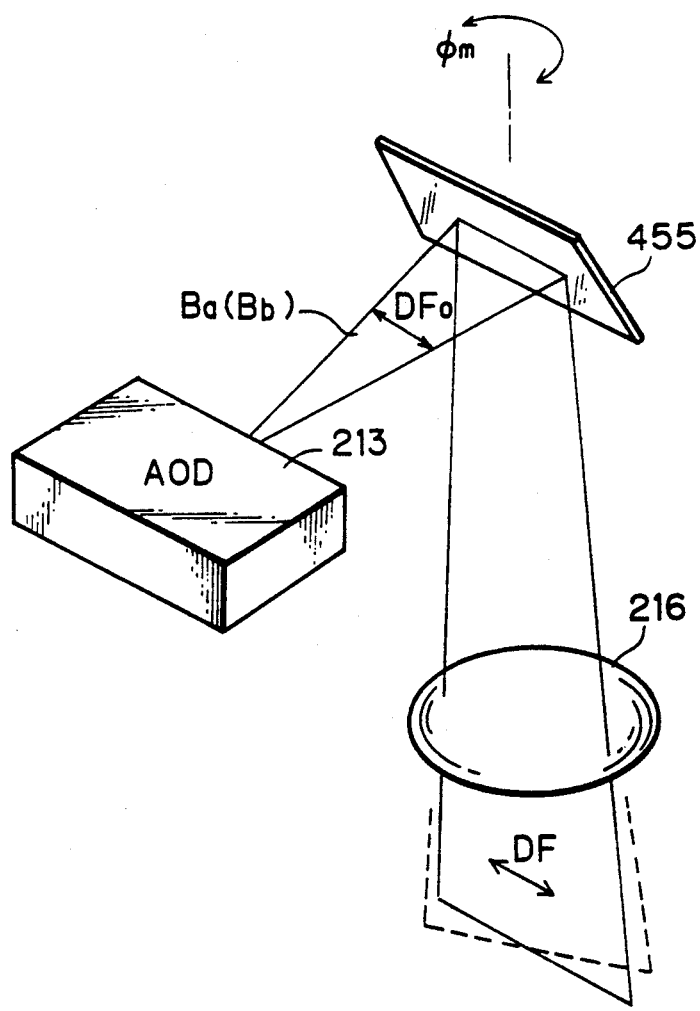

Incidentally, a mirror 455 shown in FIG. 28 can be used to change the deflection direction of the laser beams $B_a$ and $B_b$. If the mirror 455 is rotated on an axis $\phi_m$, the deflection direction DF is also rotated. Since reflecting positions of the beams $B_a$ and $B_b$ on the mirror 455 are changed in response to the rotation of the mirror 455, the central paths of the beams $B_a$ and $B_b$ reflected by the mirror 455 is displaced accordingly. The pechan prism 401 or the dove prism 450 is preferred to the mirror 455 to avoid this displacement.

Figure 29:
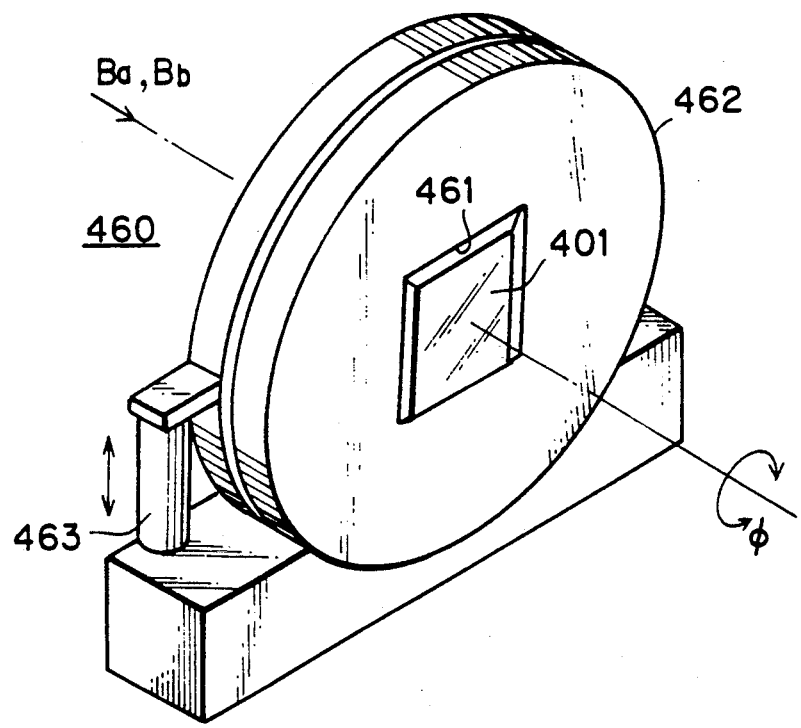

FIG. 29 is a perspective view of another mechanism 460 for rotating the pechan prism 401. The mechanism 460 comprises a disc 462 having a window 461. The pechan prism 401 is fitted in the window 461. The disc 462 is mounted on a base 463 and drived by expansion of a piezoelectric element 463 to rotate on its central axis; the pechan prism 401 is rotated with the disc 462 accordingly.

Figure 30:
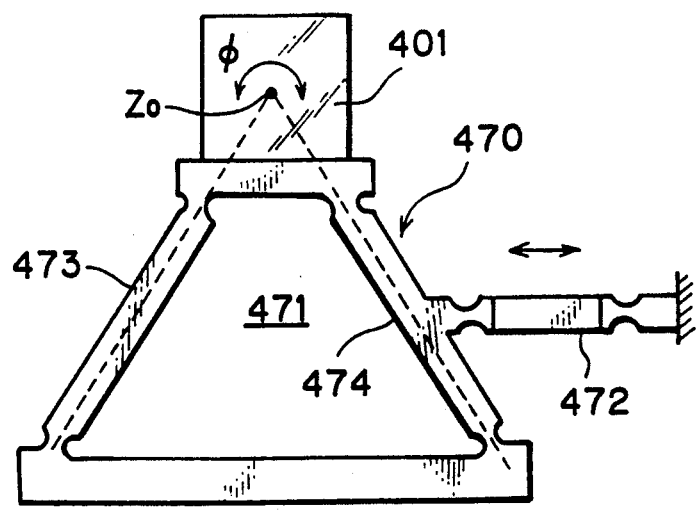

FIG. 30 is a front view of still another mechanism 470 for rotating the pechan prism. The mechanism 470 comprises a four-node notched link mechanism 471 moved by a piezoelectric element 472. Extended lines of arms 473 and 474, which are opposite sides of the link mechanism 470 intersect at a center $Z_0$ of the pechan prism 401. The pechan prism 401 is rotated on the center $Z_0$ in response to expansion and contraction of the piezoelectric element 472.

Figure 31:
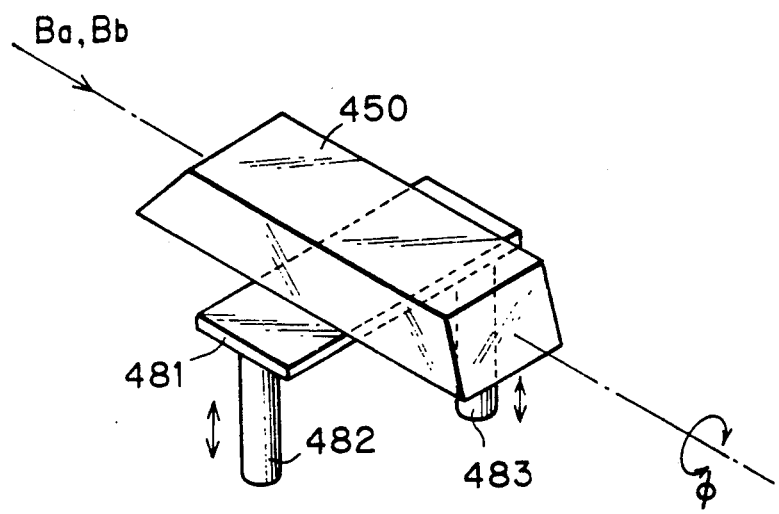

FIG. 31 is a perspective view of another mechanism for rotating the dove prism 450. The mechanism comprises a stage 481 and piezoelectric elements 482 and 483. The dove prism 450 is fixed on the stage 481, and the stage 481 is supported by the piezoelectric elements 482 and 483. The dove prism 450 can be rotated by expansion and contraction of the piezoelectric elements 482 and 483 in opposite directions. Incidentally, the mechanisms shown in FIGS. 29-31 can be applied either of the pechan prism 401 and the dove prism 450.

Figure 32:
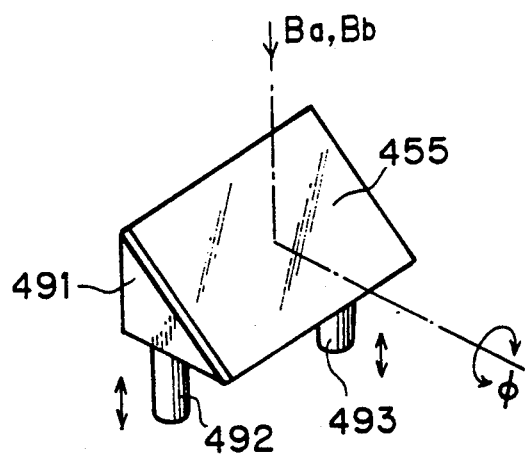

FIG. 32 is a perspective view of a mechanism for rotating the deflection direction with the mirror 455 shown in FIG. 28. The mechanism comprises a stage 491 and piezoelectric elements 492 and 493. The stage 491 of a triangle shape is supported by the piezoelectric elements 492 and 493. The mirror 455 is rotated by expansion and contraction of the piezoelectric elements 492 and 493 in opposite directions.

The inclination of the scanning lines are desirably compensated by the deflection direction adjuster 400. However, if the feeding speed $V_Y$ of the photosensitive material 1 is comparatively low and the drawing operation is performed while the photosensitive material 1 is moved in one particular direction, the compensation for the inclination can be actually omitted. In this case, the deflection direction adjuster 400 can be omitted accordingly.

According to the first aspect of the present invention described above, intersection angles of a plurality of optical beams in deflecting means are variable and distances between the plurality of optical beams can arbitrarily changed. Therefore, a pixel pitch on photosensitive material can be changed separately from a spot size. Further, the plurality of optical beams are arrayed to always intersect in the deflecting means, and the optical beams do not miss the deflecting means even if the distances between the light beams are changed.

When a beam focusing means comprises an optical system whose focal length is changeable, the spot size can be also separately changed.

When deflection direction rotating means and means for rotating the deflection direction rotating means are provided in the optical beam scanning system, the inclination of scanning lines can be compensated in response to the change of pixel pitch. Since the inclination can be compensated in both directions of the reciprocating scanning operation, an image can be formed without distortion on the photosensitive material even by the reciprocating scanning operation. Since the reciprocating scanning operation can be performed faster than the one way scanning operation, an image without distortion can be formed faster accordingly.

Figure 33:
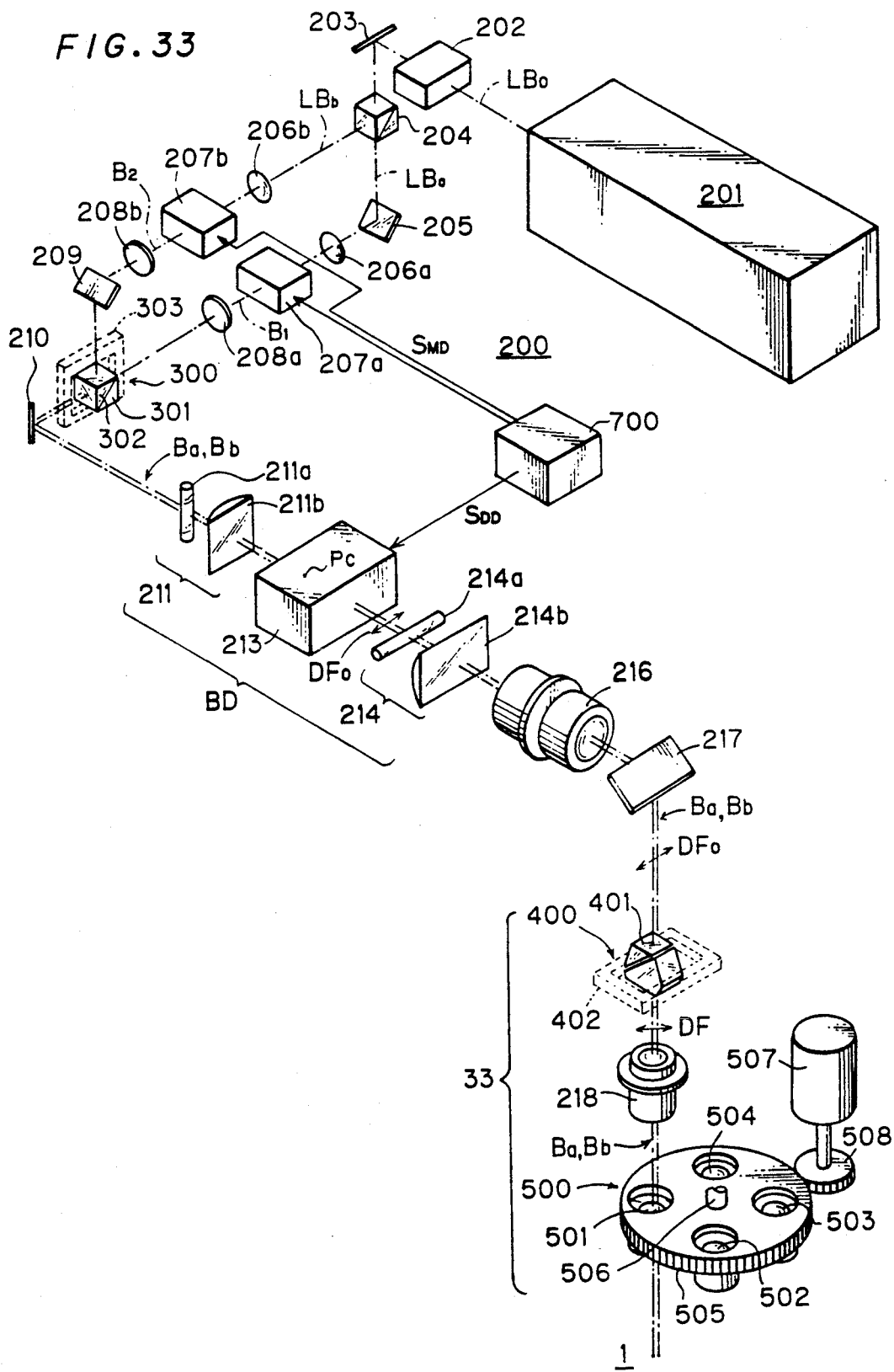
FIG. 33 is a perspective view of another optical beam scanning system according to the present invention.

FIG. 33 is a perspective view of an optical beam scanning system according to the second aspect of the present invention. The optical beam scanning system is constructed by adding beam expanders 211 and 214 at the object side and the image side of the AOD 213, respectively. A control unit 700 shown in FIG. 33 includes the drawing control unit 70 and the AOD drivers 71 and 72.

Incidentally, the functions of the beam expanders 211 and 214 are not influenced by the number of beams. Therefore embodiments according to the second aspect of the present invention will be described below with a single optical beam.

Figure 34:
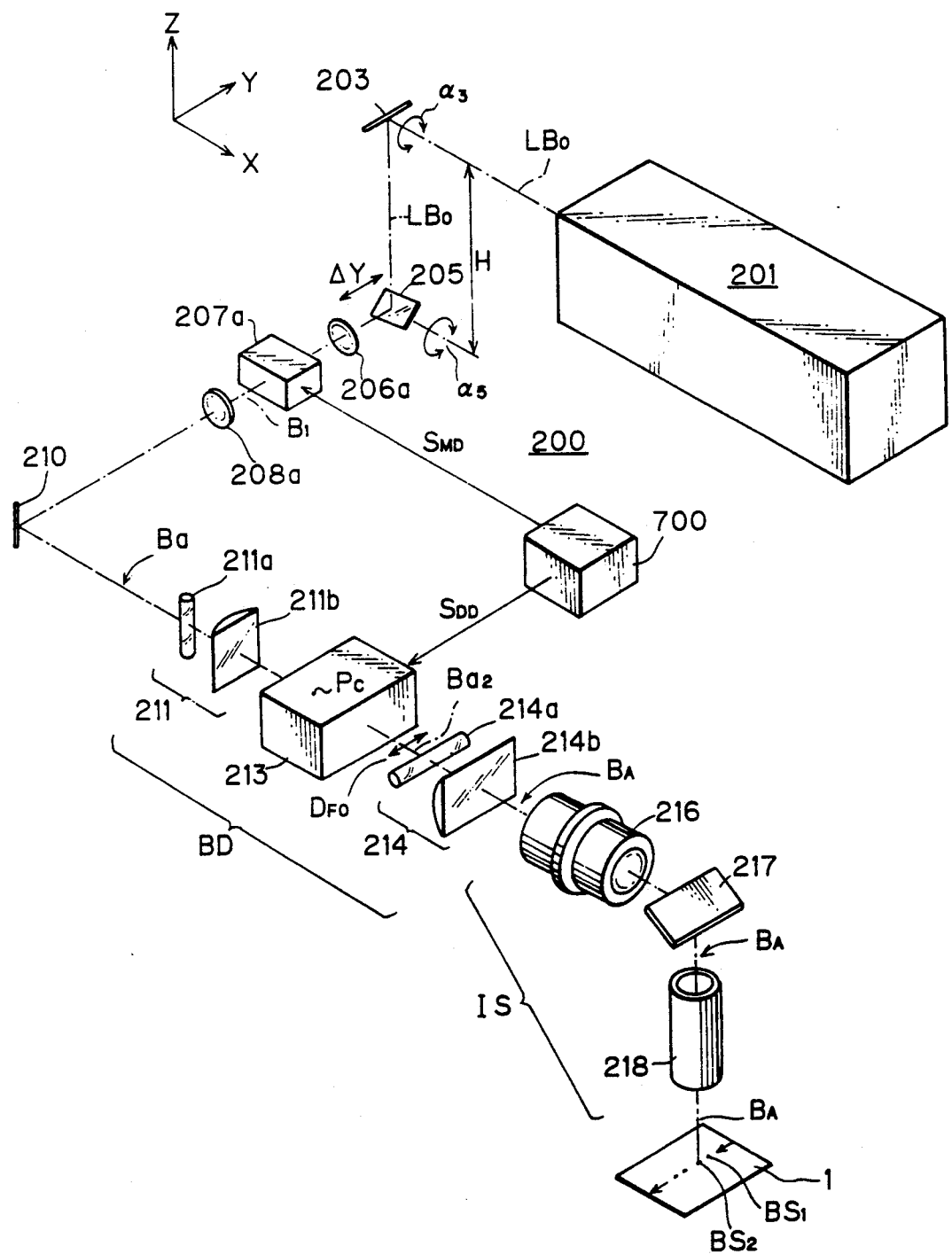
FIG. 34 is a perspective view showing simplified structure of the optical beam scanning system shown in FIG. 33.

FIG. 34 is a perspective view of the optical beam scanning system for scanning a single beam, which is simplified from FIG. 33. The elements 204, 206b, 207b, 208b, 209, 300, 400, and 500 shown in FIG. 33 are omitted for the simplification.

In FIG. 34, the laser beam $LB_0$ emitted from the $Ar^+$ laser 201 is reflected by the mirrors 203 and 205, whereby the height of the laser beam is changed.

The mirror 203 can be rotationally adjusted round an axis parallel to the direction X in a prescribed angle range $\alpha_3$. Similarly, the mirror 205 can be rotationally adjusted round an axis parallel to the direction X in a prescribed angle range $\alpha_5$. The mirror 205 can be also moved parallel in the direction Y. The angle ranges $\alpha_3$ and $\alpha_5$ are set at least between $-5°$ and $+5°$. Assuming that a distance between the mirrors 203 and 205 is H, a range $\Delta Y$ in which the mirror 205 can be moved is set at least between $-H\cdot\tan 5°$ and $+H\cdot\tan 5°$.

The mirrors 203 and 205 can be adjusted as described above so that linearly polarized light whose direction of polarization is precisely parallel to the deflection direction $DF_0$ is introduced in the AOD 213. The laser beam $LB_0$ emitted form the laser 201 is light linearly polarized in the vertical direction. However, since the direction of polarization of the emitted beam has an error of about 5%, the direction of polarization is corrected with the mirrors 203 and 205 so that the laser beam introduced in the AOD 213 is precisely polarized linearly in a direction parallel to the deflection direction $DF_0$, which is parallel to the direction Y. According to the adjustment of the mirrors, diffraction efficiency of the AOD 213 can be maximized. The combination of the mirrors 203 and 205 turns the direction of polarization without using special means for turning the direction of polarization such as a halfwave plate.

The laser beam $LB_0$ reflected by the mirrors 203 and 205 is converged by the converging lens 206a, and introduced in the AOM 207a. The AOM 207a performs on-off modulation on the laser beam $LB_0$ to generate the outgoing beam $B_1$ in response to the AOM drive signal $S_{MD}$. The AOM drive signal $S_{MD}$ is supplied from the control unit 700. The modulated beam $B_1$ is made a parallel bundle rays by the collimator lens 208a, reflected by the mirror 210, and then introduced in a beam deflection system BD.

Figure 35A:
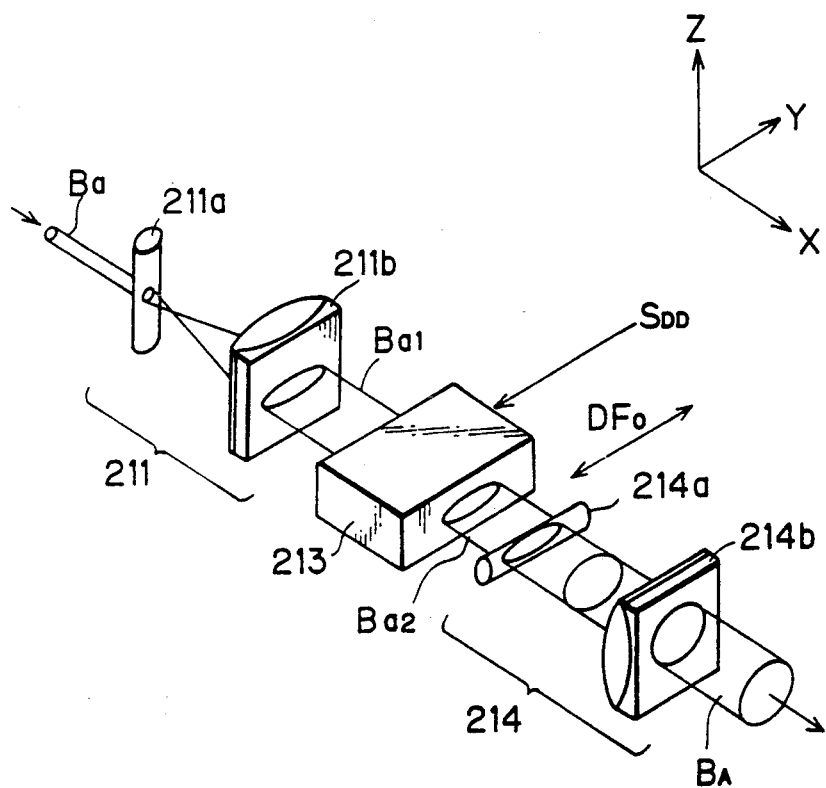
FIG. 35A is a perspective view of an optical beam deflecting device according to the present invention.
Figure 35B:
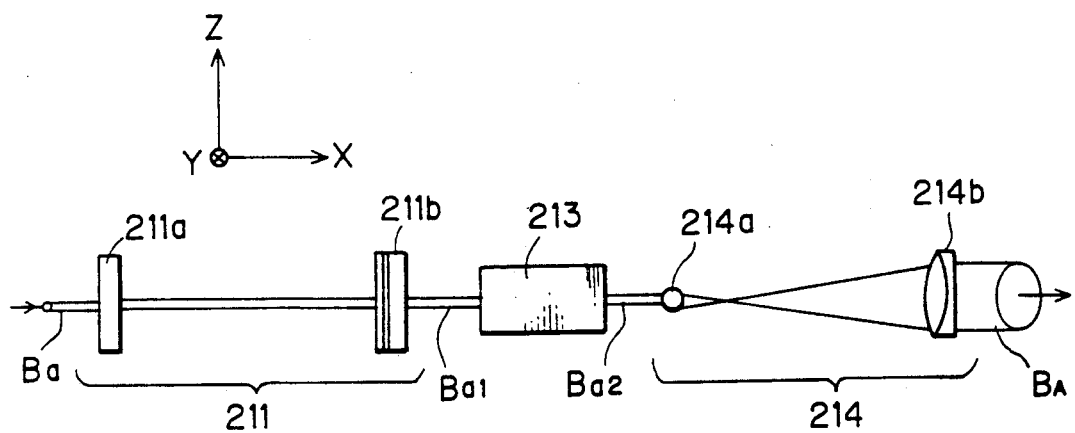
FIG. 35B is a plan view of the optical beam deflecting device.
Figure 35C:
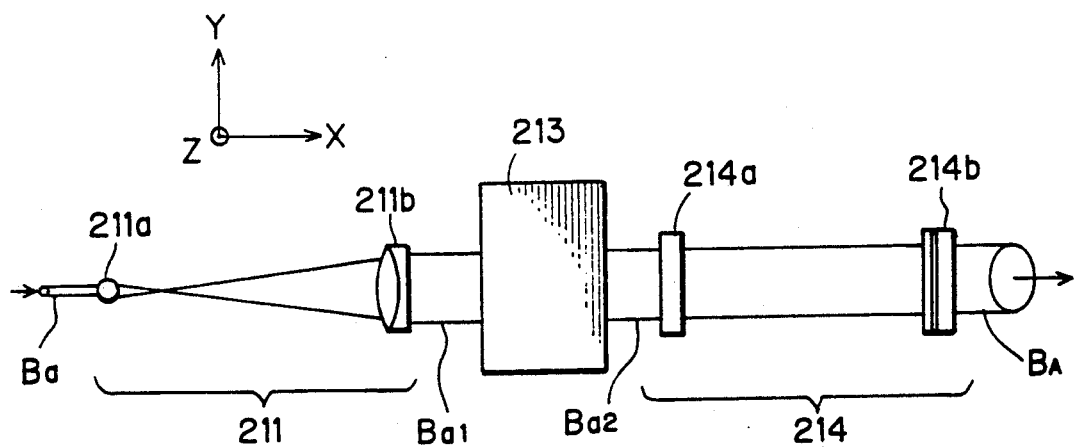
FIG. 35C is a front view of the optical beam deflecting device.

The beam deflection system BD comprises the horizontal expander 211, the AOD 213, and the vertical expander 214. FIG. 35A is an enlarged perspective view of the beam deflection system BD, FIG. 35B is its front view, and FIG. 35C is its plan view. The horizontal expander 211 consists of a rod lens 211a and a cylindrical convex lens 211b, both of which have refracting powers in the direction Y, and expands the beams $B_1$ only in the direction Y accordingly. Consequently, a beam $B_{a1}$ expanded by the horizontal expander 211 has a cross section of an ellipse whose horizontal axis is longer than the vertical one. The horizontal expander 211 also functions as a compensation lens system for compensating the cylindrical lensing effect of the AOD 213, as described later.

The beams $B_{a1}$ expanded by the horizontal expander 211 is introduced in the AOD 213. The AOD 213 deflects its outgoing beam $B_{a2}$ in the deflection direction $DF_0$ parallel to the direction Y in response to the AOD drive signal $S_{DD}$ supplied from the control unit 700. The outgoing beam $B_{a2}$ is expanded only in the direction Z by the vertical expander 214 to become a beam $B_A$ of a parallel bundle of rays. Consequently, the beam $B_A$ has a cross section of about a circle. The vertical expander 214 consists of a rod lens 214a and a cylindrical convex lens 214b, both of which have refracting powers in the direction Z.

The beam $B_A$ leaving the beam deflection system BD is converged by an image forming system IS comprising the scan lens 216, the mirror 217, and the relay lens 218 to be focused on the photosensitive material 1.

As the laser beam $B_1$ is expanded in the beam deflection system BD, as described above, the number of resolvable spots on the photosensitive material 1 is increased. The number of resolvable spots are defined to be the number of beam spots each of which can be identified on one scanning line. The number of resolvable spots $N_D$ is given by the following equations:

$$N_D = W/D_1 \tag{35a}$$

$$D_1 = 1.27\lambda F \tag{35b}$$

where W is a scanning width on the photosensitive material 1, $D_1$ is a diameter of a spot on the photosensitive material 1, $\lambda$ is a wavelength of the laser beam, and F is a F number. The F number is given as follows, as well known in the art:

$$F = f/D_2 \tag{36}$$

where f is a focal length of the image forming system IS, and $D_2$ is a diameter of an entrance pupil or a width of the beam $B_{a1}$ incident on the AOD 213. Since the beam $B_{a1}$ incident on the AOD 213 is a laser beam, the value $D_2$ is defined by the width of the beam $B_{a1}$.

The number of resolvable spots $N_D$ is found from the equations (35a), (35b), and (36) as follows:

$$N_D = WD_2/1.27\lambda f \tag{37}$$

The value in the right hand side of the equation (37) except the width $D_2$ of the incident beam are determined from the characteristics of the image forming system IS and a deflection angle of the AOD 213. Therefore, the number of resolvable spots $N_D$ increase as the width of the beam $B_{a1}$ incident on the AOD 213 increases.

Incidentally, the beam $B_{a1}$ incident on the AOD 213 has a cross section of an ellipse whose axis in the direction Y is the longer one, as described before. This is because aperture of the AOD 213 is made to have a rectangular shape according to restrictions in fabrication. The acoustical cell 213a of the AOD 213 is made of a crystal of $TeO_2$, for example, and it is difficult to fabricate a crystal of $TeO_2$ having a large square cross section. On the other hand, the number of resolvable spots depends on the width of the incident beam $B_{a1}$ measured in the deflection direction $DF_0$ of the AOD 213. On account of the above facts, the longer side of the rectangular aperture of the AOD 213 is layed in the deflection direction $DF_0$, and the beam $B_{a1}$ whose width is longer in the deflection direction $DF_0$ is introduced in the AOD 213 in order to increase the number of resolvable spots $N_D$.

Out of the two expanders 211 and 214, the horizontal expander 211 placed at the object side of the AOD 213 functions as a compensating lens system for compensating the cylindrical lensing effect of the AOD 213. In order to attain this function, the focal point of the rod lens 211a is not placed at the same position as that of the cylindrical convex lens 211b; therefore they do not constitute a telescopic system.

Figure 36A:
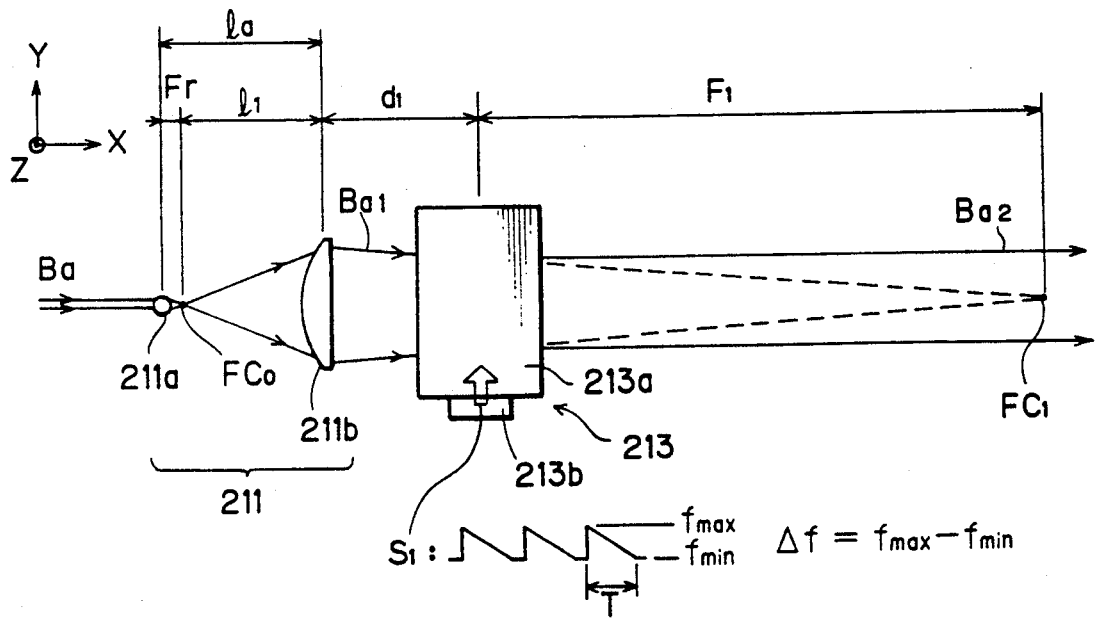
FIGS. 36A and 36B are diagrams schematically showing a method of positioning a beam expander at an object side of an AOD.

FIG. 36A schematically illustrates a method for compensating the cylindrical lensing effect with the horizontal expander 211. The transducer 213b of the AOD 213 generates an ultrasonic wave $S_1$ whose frequency is swept toward the lower value. In this condition, the acoustical cell 213a of the AOD 213 functions as a concave lens. A focal length of the imagenary concave lens is given as follows:

$$F_1 = v^2 \cdot T/\lambda \cdot \Delta f \tag{38}$$

where v is an acoustic velocity in the acoustical medium 213a, T is a sweep time of the ultrasonic wave, $\lambda$ is a wavelength of the laser beam, and $\Delta f$ is a bandwidth of the ultrasonic wave (=fmax−fmin).

If the beam $B_{a1}$ leaving the horizontal expander 211 is made a convergent ray converging at an image-side focal point $FC_1$ of the imagenary concave lens, that is, the AOD 213, the concave lensing effect of the AOD 213 is compensated, and thereby the outgoing beam $B_{a2}$ is made a parallel bundle of rays. The focal point $FC_1$ is located the focal length $F_1$ distant from a diffraction position in the AOD 213. The following equation also holds:

$$1/l_1 + 1/(F_1 + d_1) = 1/F_S \tag{39}$$

where $l_1$ is a distance from an image-side focal point $FC_0$ of the rod lens 211a to the cylindrical lens 211b, $d_1$ is a distance from the cylindrical lens 211b to the diffraction position in the acoustic cell 213a, and $F_S$ is a focal length of the cylindrical lens 211b.

It can be easily understood that the cylindrical lensing effect of the AOD 213 can be compensated by adjusting the distance $l_1$. In other words, it is not required to fabricate the cylindrical lens 211b with high accuracy in order to compensate the cylindrical lensing effect, but the distance $l_1$ and/or the distance $d_2$ can be adjusted for that purpose in response to the actual focal length $F_S$ of the fabricated cylindrical lens 211b.

Figure 36B:
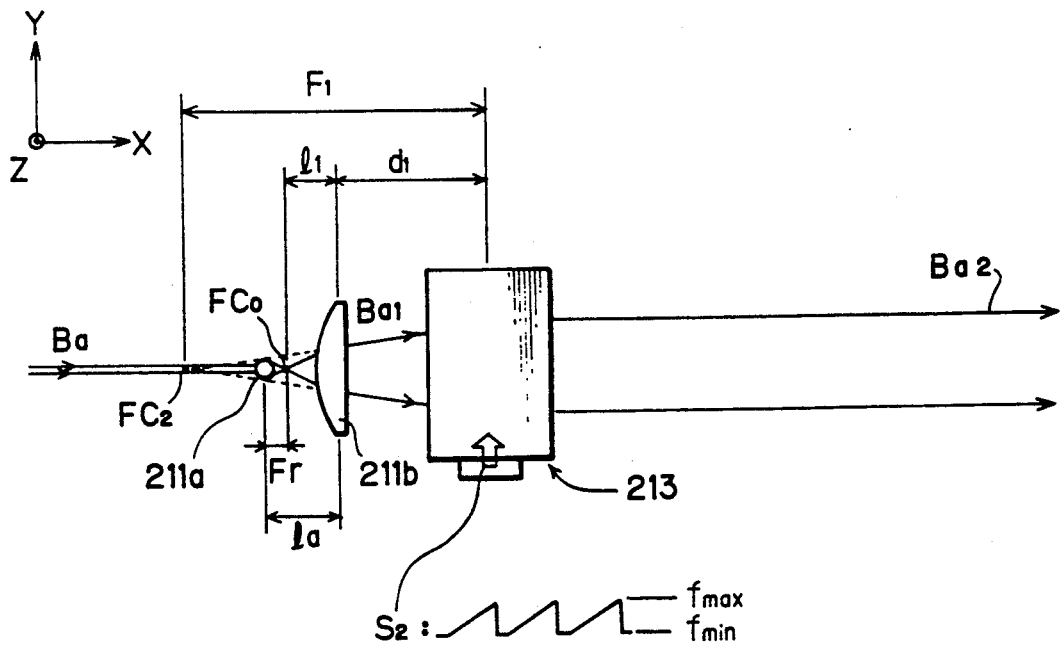

FIG. 36B schematically illustrates a case where the transducer 213b generates an ultrasonic wave $S_2$ whose frequency is swept toward the higher value. In this case, the acoustical cell 213a functions as a convex lens, and its focal length is also given by the equation (38). If the beam $B_{a1}$ leaving the horizontal expander 211 is made a divergent ray diverging from an object-side focal point $FC_2$ of the imagenary convex lens, the convex lensing effect is compensated, and thereby the outgoing beam $B_{a2}$ of the AOD 213 is made a parallel ray. The focal point $FC_2$ is located the focal length $F_1$ distant from the diffraction position in the acoustic cell 213a. The following equation similar to the equation (39) holds in this case:

$$-1/(F_1 - d_1) + 1/l_1 = 1/F_S \tag{40}$$

The following table 1 is obtained by substituting concrete values for the variables in the equations (38)–(40).

TABLE 1

|  | CONCAVE LENSING | CONVEX LENSING |
| --- | --- | --- |
| v (m/s) | 650 | 650 |
| T (μs) | 70 | 70 |
| λ (μm) | 0.488 | 0.488 |
| Δf (MHz) | 50 | 50 |
| $d_1$ (mm) | 50 | 50 |
| $F_s$ (mm) | 64 | 64 |

TABLE 1-continued

| | CONCAVE LENSING | CONVEX LENSING |
|---|---|---|
| $F_r$ (mm) | 4.4 | 4.4 |
| $F_1$ (mm) | 1,212 | 1,212 |
| $l_1$ (mm) | 67.4 | 60.4 |
| $l_a$ (mm) | 71.8 | 65.1 |

The values $F_1$, $l_1$, and $l_a$ are found while assuming the values of v, T, λ, Δf, $d_1$, $F_s$, and $F_r$, where $F_r$ is a focal length of the rod lens 211a, and $l_a (=l_1+F_r)$ is a distance between the rod lens 211a and the cylindrical lens 211b. As can be seen from the table 1, the concave lensing and convex lensing can be compensated by adjusting the positions of the rod lens 211a and the cylindrical lens 211b in this embodiment. If the sweeping speed of the AOD 213 is changed and the focal length $F_1$ of the acoustical cell 213a due to the cylindrical lensing effect is changed, the outgoing beam $B_{a2}$ can be made a parallel bundle of rays by adjusting the distances a and $d_1$.

The horizontal expander 211 is installed to mainly expand the width of the incident beam $B_{a1}$ to thereby increase the number of resolvable spots $N_D$. That is, the beam deflection system BD compensates the cylindrical lensing effect of the AOD 213 without any additional lens for compensating the effect.

In order to compensate the cylindrical lensing effect at the image side of the AOD 213, as is often done in the prior art, a compensating lens is required other than the vertical expander 214. This is because the compensating lens for the cylindrical lensing effect should have a refracting power in the deflection direction $DF_0$ of the AOD 213 (or the direction Y), and because the vertical expander 214 has the refracting power only in the direction Z.

The beam deflection system has further advantages as follows. Since the cylindrical lensing effect is compensated at the object side of the AOD 213, the beam $B_{a2}$ leaving the AOD 213 becomes a parallel bundle of rays. As a result, the vertical expander 214 placed at the image side of the AOD 213 and the image forming system IS can constitute a telecentric system, in particular, the vertical expander 214 can be a telescopic system. Accordingly, the converging characteristics of those optical system cannot be deteriorated.

As described above, the horizontal expander 211 placed at the object side of the AOD 213 is constructed as a convergent system or a divergent system to compensate the concave or convex cylindrical lensing effect. On the other hand, the vertical expander 214 placed at the image side of the AOD 213 is constructed as a telescopic system. However, the specifications of the rod lenses 211a and 214a are made equal to each other, and those of the cylindrical lenses 211b and 214b are also made equal to each other.

The specifications of the lenses 211a, 214a, 211b, and 214b are determined as follows. Firstly, the focal length $F_r$ of the rod lenses 211a and 214a and the focal length $F_s$ of the cylindrical lenses 211b and 214b are determined. The summation of the focal lengths $F_r$ and $F_s$, that is, $(F_r+F_s)$ is equal to the length of the vertical expander 214 which is a telescopic system, and almost equal to the length of the horizontal expander 211. Shorter values of the focal lengths $F_r$ and $F_s$ are therefore preferable in order to shorten the total length of the optical system. It is further taken into account that the lenses of shorter focal length is difficult to design. A ratio $(F_s/F_r)$ should be also taken into account because the ratio $(F_s/F_r)$ means the magnification of the horizontal expander 211, which expands the width of the beam $B_{a1}$ to the width of the aperture of the AOD 213. On account of the above items, the diameter of the rod lenses 211a and 214a is determined to be 6 mm. Consequently, their focal length $F_r$ becomes 4.4 mm. The focal length $F_s$ of the cylindrical lenses 211b and 214b is determined to be 64 mm accordingly.

Figure 37:
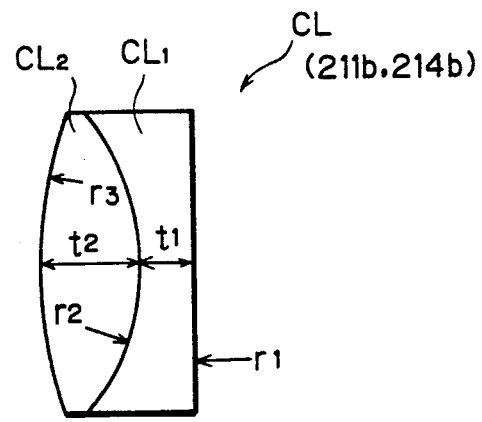
FIG. 37 is a transverse sectional view of a compound lens included in the beam expander.

Secondly, the shape of the cylindrical lenses 211b and 214b and their materials are determined. If the cylindrical lenses 211b and 214b are single lenses, it is difficult to attain the aberrations below desired values. In this embodiment, therefore, a compound lens CL shown in FIG. 37 is used as the cylindrical lenses 211b and 214b. The compound lens CL consists of a concave lens $CL_1$ and a convex lens $CL_2$. The lens parameters of the compound lens CL are as follows:

$r_1$: a curvature of the outer surface of the concave lens CL1

$r_2$: a curvature of the boundary between the concave lens $CL_1$ and the convex lens $CL_2$ $r_3$: a curvature of the outer surface of the convex lens $CL_2$ $t_1$: a thickness of the concave lens $CL_1$ $t_2$: a thickness of the convex lens $CL_2$ $n_1$: a refractive index of the concave lens $CL_1$ $n_2$: a refractive index of the convex lens $CL_2$ The focal length of the compound lens, that is, the focal length $F_s$ of the cylindrical lenses 211b and 214b is expressed as a function $f_1$ of the lens parameters as follows:

$$F_s = f_1(r_1, r_2, r_3, t_1, t_2, n_1, n_2) \qquad (41)$$

The focal length $F_s$ is set to be 64 mm as stated before.

As to the horizontal expander 211, it is required to decrease the transverse aberration as much as possible while the distance from the AOD 213 is determined according to the equation (39) or (40). In general, a value of the aberration is evaluated with respect to two rays passing through the positions which correspond to 70% and 100% of an effective diameter (or a pupil) of the lens. Values of the transverse aberration DY(7) and DY(10) at the positions corresponding to 70% and 100% of the effective diameter of the horizontal expander 211 are expressed as functions $f_2$ and $f_3$ of the lens parameters:

$$DY(7) = f_2(r_1, r_2, r_3, t_1, t_2, n_1, n_2) \qquad (42)$$

$$DY(10) = f_3(r_1, r_2, r_3, t_1, t_2, n_1, n_2) \qquad (43)$$

Meanwhile, it is required to decrease the angular aberration of the vertical expander 214 because the vertical expander 214 is constructed as a telescopic system (or an afocal system). A value of the angular aberration is also evaluated with respect to two rays passing through the positions which correspond to 70% and 100% of an effective diameter of the lens. Values of the angular aberration DYA(7) and DYA(10) at the positions corresponding to 70% and 100% of the effective diameter of the horizontal expander 214 are also expressed as functions $f_4$ and $f_5$ of the lens parameters as follows:

$$DYA(7) = f_4(i \; r_1, r_2, r_3, t_1, t_2, n_1, n_2) \qquad (44)$$

$$DYA(10) = f_5(i \; r_1, r_2, r_3, t_1, t_2, n_1, n_2) \qquad (45)$$

Values of the lens parameters are determined by the DLS method (Damped Least Square method) or the like on the basis of the expressions (42)–(45). For example, since the value of the focal length $F_s$ is determined as stated before, the expressions (42)–(45) can be solved by the DLS method while using the expression (41) as a boundary condition. Some computer programs for performing the DLS method, such as "Super-Oslo" of Siniclair Optics, Inc., are available to solve the above problem.

The following values are examples of the lens parameters thus obtained:

$r_1 = \infty$, $r_2 = 23.77$ mm, $r_3 = 44.26$ mm,
$t_1 = 3$ mm, $t_2 = 5.2$ mm,
$n_1 = 1.8059$ (SF11), $n_2 = 1.7642$ (LaF7)

According to the above example, the concave lens $CL_1$ is made of SF11, and the convex lens $CL_2$ is made of LaF7.

The horizontal expander 211 including the compound lens CL can attain the transverse aberration no more than 3 μm and the wavefront aberration no more than λ/4. The vertical expander 214 including the compound lens CL can attain the angular aberration no more than 50 urad and the wavefront aberration no more than λ/4.

If the cylindrical lens is fabricated as a single lens made of SF11 having high refractive index, its focal length $F_s$ becomes more than 75 mm, which is far longer than that of the compound lens CL. On the contrary, in the above embodiment, the total length of the expanders 211 and 214 is reduced by using the compound lens CL.

In short, in the above embodiment, both of the expander 211 of a focal system and the expander 214 of an afocal system can be constructed as combinations of the same rod lens (211a, 214a) of a relatively short focal length and the same cylindrical lens (211b, 214b) of a relatively long focal length. Further, the aberrations of the expanders 211 and 214 can be made considerable low, and their total lengths can be shortened.

As described above, the cylindrical lensing effect can be compensated by adjusting the distance $l_a$ ($=l_1+F_r$) between the rod lens 211a and the cylindrical lens 211b in the horizontal expander 211 according to the equation (36) or (37). However, since a fabrication error of a focal length is about 5%, it is desirable to confirm whether or not the cylindrical lensing effect is well compensated and to re-adjust the distance $l_a$, if necessary.

Figure 38:
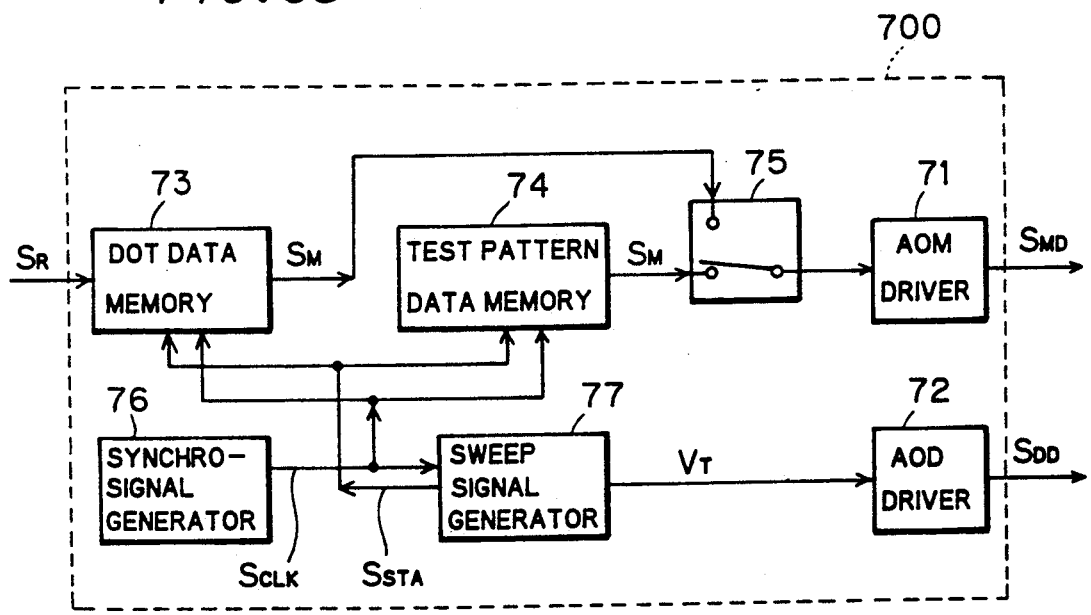
FIG. 38 is a block diagram of a circuit for confirming a state of compensation of the cylindrical lensing effect.
Figure 39A:
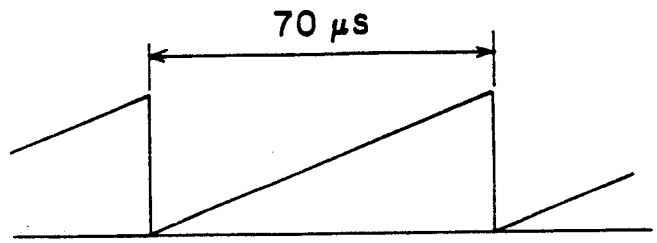
FIGS. 39(a)-39(e) are timing charts of the circuit shown in FIG. 38.
Figure 39B:
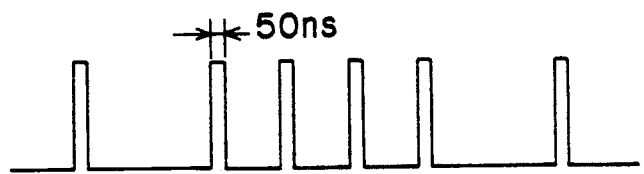
Figure 39C:
Figure 39D:
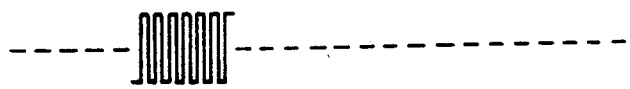
Figure 39E:

The control circuit 700 produces a signal for confirming the result of the compensation of the cylindrical lensing effect. FIG. 38 is a block diagram of the internal structure of the control circuit 700.

When ordinary scanning operation is performed, a switch 75 connects a dot data memory 73 and the AOD driver 71. Dot data $S_R$ (or raster data), supplied from an external circuit (not shown) to the control circuit 700, are stored in the dot data memory 73. The dot data memory 73 receives a read start signal $S_{STA}$ supplied from a sweep signal generator 77, and supplies the dot data $S_R$ as a modulation signal $S_M$ to the AOD driver 72 in synchronism with a read clock signal $S_{CLK}$ given by a synchronising signal generator 76. The AOD driver 71 produces the AOD drive signal $S_{MD}$ in response to the modulation signal $S_M$, to thereby on-off control the AOM 207. The AOD driver 72 produces the AOD drive signal $S_{DD}$ in response to a sweep signal $V_T$ supplied from the sweep signal generator 77, to thereby control the AOD 213.

When the result of the compensation of the cylindrical lensing effect is to be confirmed, the switch 75 is switched to connect a test pattern data memory 74 and the AOM driver 71. FIGS. 39(a)–39(e) are timing charges in the operation for confirming the result of the compensation. The sweep signal $V_T$ is produced in response to the read start signal $S_{STA}$ and in synchronism with the read clock signal $S_{CLK}$. The sweep signal $V_T$ and the AOD drive signal $S_{DD}$ make the transducer 213b of the AOD 213 to generate an ultrasonic wave whose frequency is swept from a low value to a high value in a cycle of 70 μs. The modulation signal $S_M$ outputted rom the test pattern memory 74 (therefore the AOM drive signal $S_{MD}$) turns on the AOM 207 a few times (four times in FIG. 39b)) in every sweep cycle. As a result, the photosensitive material 1 is scanned with the beam $B_a$ as shown in FIG. 34. In each scanning operation, a few spots $BS_1$, $BS_2$, . . . can be observed on the photosensitive material 1 with a predetermined interval. It is easy to judge whether or not the astigmatism is well eliminated by observing the beam spots $BS_1$, $BS_2$, . . . thus formed on the photosensitive material 1. Incidentally, since the diameter of the beam spots $BS_1$, $BS_2$, . . . is small as a few μm, observing means for observing the beam spots $BS_1$, $BS_2$, . . . is inserted between the lens system 218 and the photosensitive material 1. Incidentally, the lens system 218 is a telecentric system to contract the beam $B_{a2}$ of a parallel bundle of rays leaving the AOD 213, as described before. The observing means may be so constructed that the beam spots $BS_1$, $BS_2$, . . . are expanded with its lens system, and that an observer observes the expanded beam spots with naked eye. Instead, the observing means may include a CCD camera to obtain the images of the beam spots $BS_1$, $BS_2$, . . . and a CRT to display the images.

When it is observed that the astigmatism is not eliminated enough, the distance a between the rod lens 211a and the cylindrical lens 211b in the horizontal expander 211 is adjusted again. By this adjustment, the astigmaism can be reduced while the cylindrical lensing effect of the AOD 213 is well compensated.

In the above embodiment, the one-directional expanders 211 and 214 are constructed with a same combination of a rod lens and a cylindrical lens. However, the one-directional expanders may be constructed with plural cylindrical lenses. Since the rod lens is one type of the cylindrical lens in a broad sense of the word, the expanders in the above embodiment can be said to include two cylindrical lenses.

As to the one-directional expander 211 placed at the object side of the AOD 213, the positions of the cylindrical lenses 211a and 211b, that is, the distances $l_a$ and $d_1$ are determined to make the beam $B_{a2}$ leaving the AOD 213 a parallel bundle of rays. As far as this purpose is attained, the cylindrical lens of comparatively shorter focal length out of the two lenses, the rod lens 211a in the above embodiment, can be replaced by a concave lens. Since the expander 214 at the image side of the AOD 213 can be made a telescopic system in this case, the two one-directional expanders at the object side and the image side of the AOD 213 can be constructed with a same combination of two cylindrical lenses. In general, when the one-directional expander at the object side of the AOD is constructed with a plurality of cylindrical lenses, the other one-directional expander at the image side can be constructed with the same cylindrical lenses.

According to the second aspect of the present invention, the positions of the cylindrical lenses of a first one-directional expander placed at the object side of an AOD is determined so that a beam leaving the AOD becomes a parallel bundle of rays, and thereby the cylindrical lensing effect can be compensated without an additional compensating lens of high accuracy.

Furthermore, a second one-directional expander placed at the image side of the AOD can be constructed with the same cylindrical lenses as the first one-directional expander, and this simple structure can expand a diameter of a light beam as well as compensating the cylindrical lensing effect.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An optical beam scanning system for scanning a photosensitive material with optical beams while moving said optical beams relatively to said photosensitive material, comprising:
    means for generating a plurality of optical beams;
    means for modulating said plurality of optical beams;
    beam turning means for turning modulated optical beams to thereby produce a first beam group consisting of optical beams which intersect each other at an angle of intersection at a prescribed point;
    angle changing means connected to said beam turning means for rotationally displacing said beam turning means to thereby change said angle of intersection of said first beam group;
    deflecting means placed at said prescribed point for periodically deflecting said first beam group to thereby produce a second beam group; and
    focusing means for focusing each optical beam of said second beam group on said photosensitive material.

2. An optical beam scanning system in accordance with claim 1, wherein
    said focusing means comprises a focusing optical system whose focal length is changeable.

3. An optical beam scanning system in accordance with claim 2, wherein
    said focusing optical system comprises a plurality of objective lenses whose focal lengths are different from each other, and a mechanism for selecting one of said plurality of objective lenses to focus said second beam group on said photosensitive material.

4. An optical beam scanning system in accordance with claim 2, wherein
    said focusing optical system comprises a zoom lens.

5. An optical beam scanning system in accordance with claim 2 further comprising
    direction rotation means placed between said deflecting means and said focusing means for rotating a deflection direction of said second beam group, and
    means connected to said direction rotating means for rotating said direction rotating means to thereby change an angle of rotation of said deflection direction of said second beam group.

6. An optical beam scanning system in accordance with claim 5, wherein
    said direction rotating means has a pechan prism.

7. An optical beam scanning system in accordance with claim 5, wherein
    said direction rotating means has a dove prism.

8. An optical beam scanning system in accordance with claim 5, wherein
    said deflecting means is an acousto-optic deflector having a cylindrical lensing effect by which said acousto-optic deflector is equivalent to a concave lens, and
    said optical beam scanning system further comprises:
    a first one-directional expander to expand each beam of said first beam group in a first direction, said first one-directional expander consisting of first and second cylindrical lenses placed between said angle changing means and said acousto-optic deflector, said first cylindrical lens making each beam of said first beam group a divergent ray, said second cylindrical lens making said divergent ray a convergent ray converging at an image-side focal point of said acousto-optic deflector, and
    a second one-directional expander to expand each beam of said second beam group in a second direction perpendicular to said first direction while maintaining each beam leaving said second one-directional expander a parallel bundle of rays, said second one-directional expander consisting of first and second cylindrical lenses placed between said acousto-optic deflector and said direction rotating means, said first and second cylindrical lenses of said second one-directional expander having refracting powers in said second direction.

9. An optical beam scanning system in accordance with claim 5, wherein
    said deflecting means is an acousto-optic deflector having a cylindrical lensing effect by which said acousto-optic deflector is equivalent to a convex lens, and
    said optical beam scanning system further comprises:
    a first one-directional expander to expand each beam of said first beam group in a first direction, said first one-directional expander consisting of first and second cylindrical lenses placed between said angle changing means and said acousto-optic deflector, said first cylindrical lens making each beam of said first beam group a divergent ray, said second cylindrical lens making said divergent ray a convergent ray converging at an object-side focal point of said acousto-optic deflector, and
    a second one-directional expander to expand each beam of said second beam group in a second direction perpendicular to said first direction while maintaining each beam leaving said second one-directional expander a parallel bundle of rays, said second one-directional expander consisting of first and second cylindrical lenses placed between said acousto-optic deflector and said direction rotating means, said first and second cylindrical lenses of said second one-directional expander having refracting powers in said second direction.

10. An optical beam scanning system in accordance with claim 1 further comprising:
    direction rotating means placed between said deflecting means and said focusing means for rotating a deflection direction of said second beam group, and
    means connected to said direction rotating means for rotating said direction rotating means to thereby change an angle of rotation of said deflection direction of said second beam group.

11. An optical beam scanning system in accordance with claim 10, wherein
said direction rotating means has a pechan prism.

12. An optical beam scanning system in accordance with claim 10, wherein
said direction rotating means has a dove prism.

13. An optical beam scanning system in accordance with claim 10, wherein
said deflecting means is an acousto-optic deflector having a cylindrical lensing effect by which said acousto-optic deflector is equivalent to a concave lens, and
said optical beam scanning system further comprises:
a first one-directional expander to expand each beam of said first beam group in a first direction, said first one-directional expander consisting of first and second cylindrical lenses placed between said angle changing means and said acousto-optic deflector, said first cylindrical lens making each beam of said first beam group a divergent ray, said second cylindrical lens making said divergent ray a convergent ray converging at an image-side focal point of said acousto-optic deflector, and
a second one-directional expander to expand each beam of said second beam group in a second direction perpendicular to said first direction while maintaining each beam leaving said second one-directional expander a parallel bundle of rays, said second one-directional expander consisting of first and second cylindrical lenses placed between said acousto-optic deflector and said direction rotating means, said first and second cylindrical lenses of said second one-directional expander having refracting powers in said second direction.

14. An optical beam scanning system in accordance with claim 10, wherein
said deflecting means is an acousto-optic deflector having a cylindrical lensing effect by which said acousto-optic deflector is equivalent to a convex lens, and
said optical beam scanning system further comprises:
a first one-directional expander to expand each beam of said first beam group in a first direction, said first one-directional expander consisting of first and second cylindrical lenses placed between said angle changing means and said acousto-optic deflector, said first cylindrical lens making each beam of said first beam group a divergent ray, said second cylindrical lens making said divergent ray a convergent ray converging at an object-side focal point of said acousto-optic deflector, and
a second one-directional expander to expand each beam of said second beam group in a second direction perpendicular to said first direction while maintaining each beam leaving said second one-directional expander a parallel bundle of rays, said second one-directional expander consisting of first and second cylindrical lenses placed between said acousto-optic deflector and said direction rotating means, and said first and second cylindrical lenses of said second one-directional expander having refracting power in said second direction.

15. An optical beam scanning system in accordance with claim 1, wherein
said deflecting means is an acousto-optic deflector having a cylindrical lensing effect by which said acousto-optic deflector is equivalent to a concave lens, and
said optical beam scanning system further comprises:
a first one-directional expander to expand each beam of said first beam group in a first direction, said first one-directional expander consisting of first and second cylindrical lenses placed between said angle changing means and said acousto-optic deflector, said first cylindrical lens making each beam of said first beam group a divergent ray, said second cylindrical lens making said divergent ray a convergent ray converging at an image-side focal point of said acousto-optic deflector, and
a second one-directional expander to expand each beam of said second beam group in a second direction perpendicular to said first direction while maintaining each beam leaving said second one-directional expander a parallel bundle of rays, said second one-directional expander consisting of first and second cylindrical lenses placed between said acousto-optic deflector and said focusing means, said first and second cylindrical lenses of said second one-directional expander having refracting powers in said second direction.

16. An optical beam scanning system in accordance with claim 1, wherein
said deflecting means is an acousto-optic deflector having a cylindrical lensing effect by which said acousto-optic deflector is equivalent to a convex lens, and
said optical beam scanning system further comprises:
a first one-directional expander to expand each beam of said first beam group in a first direction, said first one-directional expander consisting of first and second cylindrical lenses placed between said angle changing means and said acousto-optic deflector, said first cylindrical lens making each beam of said first beam group a divergent ray, said second cylindrical lens making said divergent ray a convergent ray converging at an object-side focal point of said acousto-optic deflector, and
a second one-directional expander to expand each beam of said second beam group in a second direction perpendicular to said first direction while maintaining each beam leaving said second one-directional expander a parallel bundle of rays, said second one-directional expander consisting of first and second cylindrical lenses placed between said acousto-optic deflector and said focusing means, said first and second cylindrical lenses of said second one-directional expander having refracting powers in said second direction.

17. An optical beam scanning system comprising:
means for generating an optical beam;
a first one-directional beam expander having a plurality of cylindrical lenses to expand said optical beam in a prescribed direction, said first one-directional beam expander having a posterior focal point;
an acousto-optic deflector receiving an expanded optical beam from said first one-directional beam expander for deflecting said expanded optical beam in said prescribed direction, wherein said acousto-optic deflector has a cylindrical lensing effect by which said acousto-optic deflector is equivalent to a lens having an anterior focal point; and
a second one-directional beam expander, placed at the image side of said acousto-optic deflector, having a plurality of cylindrical lenses to expand said deflected beam in a second direction perpendicular to said prescribed direction, wherein said posterior focal point of said first one-directional beam expander is coincident with said anterior focal point of said acousto-optic deflector.

18. An optical beam scanning system in accordance with claim 17, wherein said acousto-optic deflector is equivalent to a concave lens, and said first one-directional beam expander comprising:

a first cylindrical lens for making said optical beam a divergent ray; and a second cylindrical lens for converging said divergent ray at said anterior focal point of said acousto-optic deflector.

19. An optical beam scanning system in accordance with claim 17, wherein said acousto-optic deflector is equivalent to a convex lens, and said first one-directional beam expander comprising:

a first cylindrical lens for making said optical beam a first divergent ray; and a second cylindrical lens for diverging said first divergent ray from said anterior focal point of said acousto-optic deflector.

* * * * *